United States Patent [19]

Koulopoulos et al.

[11] Patent Number: 5,289,439
[45] Date of Patent: Feb. 22, 1994

[54] CD TRANSPORT APPARATUS

[75] Inventors: Michael A. Koulopoulos, Andover, Mass.; Ronald P. Rappel, Peterborough, N.H.; Thomas R. Hegg, Chestnut Hill, Mass.

[73] Assignee: Vimak Corporation, Woburn, Mass.

[21] Appl. No.: 889,609

[22] Filed: May 27, 1992

[51] Int. Cl.[5] .............................................. G11B 17/22
[52] U.S. Cl. .................................. 369/32; 369/44.28; 369/30; 360/78.04
[58] Field of Search ..................... 369/32, 44.28, 44.25, 369/43, 30, 33, 112; 360/78.04, 78.06, 78.09, 78.11, 78.14, 78.13, 77.03, 75

[56] References Cited

U.S. PATENT DOCUMENTS 4,943,166  7/1990  Yamashita ............................. 369/32
5,173,887  12/1992  Aoyagi et al. ......................... 369/32

Primary Examiner—Robert J. Pascal
Assistant Examiner—Ali Neyzari
Attorney, Agent, or Firm—Dick and Harris

[57] ABSTRACT

An improved CD transport apparatus wherein said apparatus incorporates a digital signal processor for processing digital audio signals read from a compact disc. The digital signal processor additionally serves to alter the gain of the digital audio signal when various control operations are commanded by the user so as to minimize audibility of extraneous noises which accompany such control operations and the potential damage which may be caused to audio components. The improved CD transport apparatus further includes a cueing switch for causing movement of the CD pickup only during movement of the cueing switch and a shuttle switch for causing movement of the CD pickup only when the shuttle switch is in an active position.

9 Claims, 24 Drawing Sheets

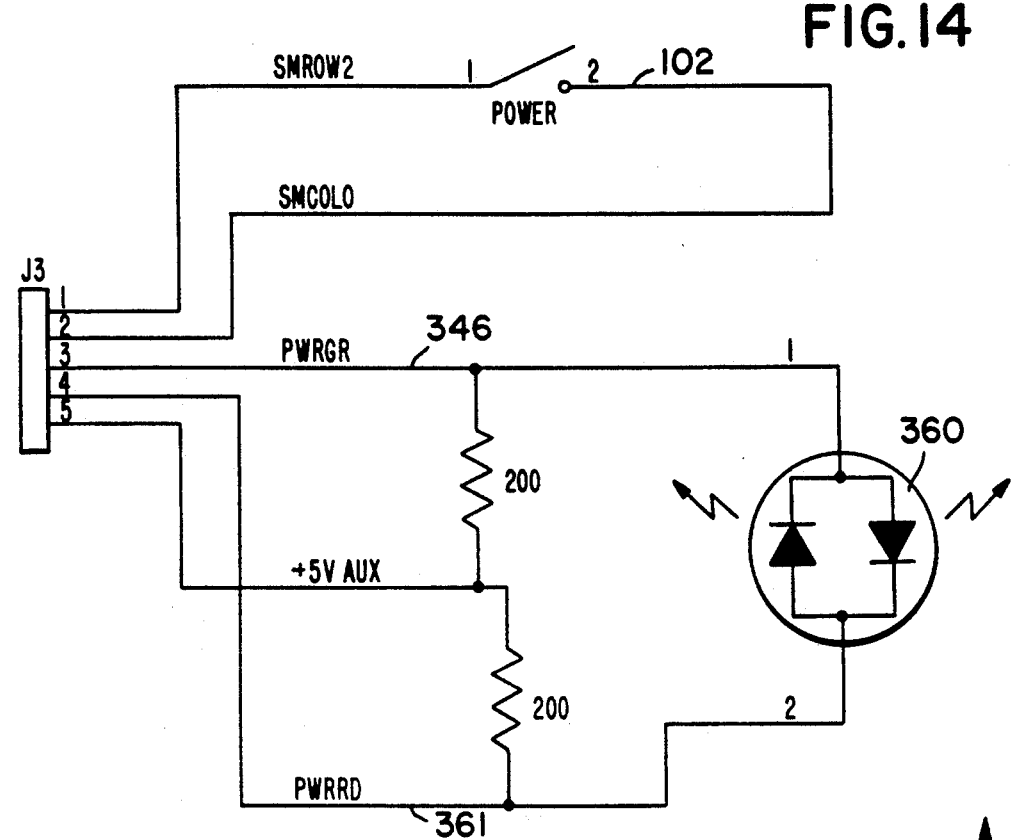
FIG.14
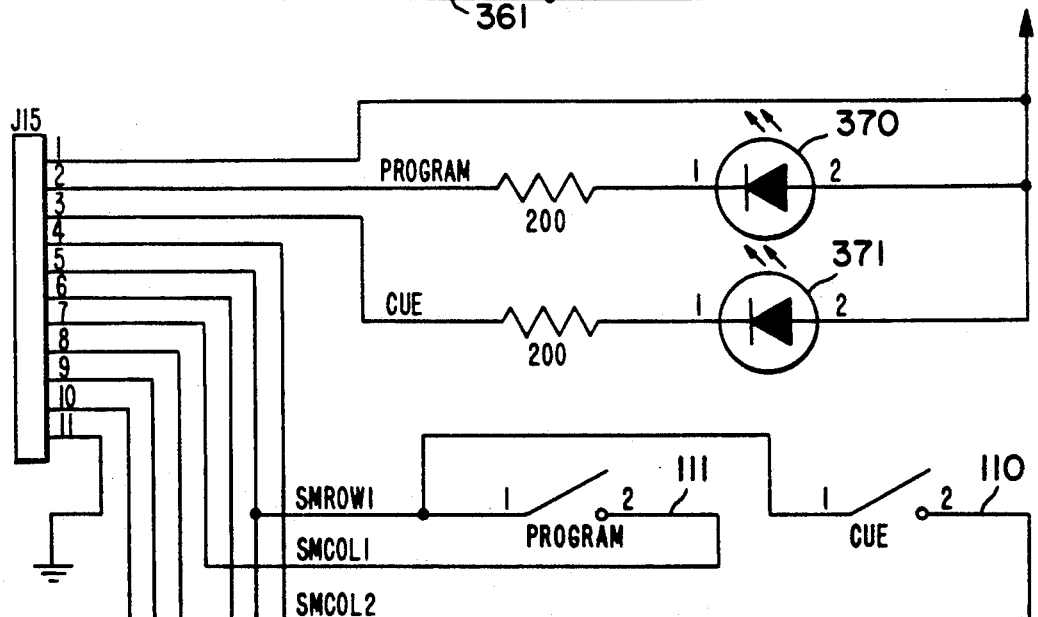
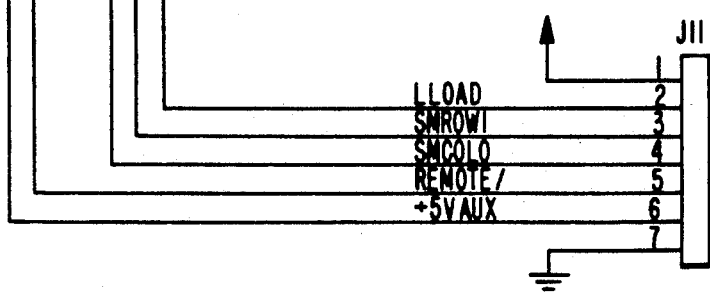
FIG.15

CD TRANSPORT APPARATUS

BACKGROUND OF THE INVENTION

The present invention relates generally to a digital audio disc transport device capable of reading digitally encoded information from compact discs (CDs), and in particular, to a disc transport device incorporating cue and shuttle searching and which is capable of muting the digital audio output during various search procedures.

CD transports (commonly referred to as CD players) in their short history have come to dominate the audio field. The compact disc contains between $2^{14}$ and $2^{15}$ grooves of digitally encoded information. Most of this digitally encoded information contains digital audio data which is converted from the digital format to an analog format toward being made audible to the listener. However, the digitally encoded information also contains track-start codes, indexing codes, disc identification codes, and various audio control information indicating, for example, that deemphasis is required.

CD transports receive the compact disc on a platform which positions the compact disc within the transport housing, such that it can be read by a moving CD optical pickup. The CD optical pickup scans the CD tracks for the digitally encoded information, which it feeds out in a serial data streams of audio and control information. The platform, CD pickup and rotating motor are all part of what is termed the "CD engine" found in all compact disc transports.

Compact discs are divided into a number of digitally encoded tracks each generally containing a single piece of music or "song". A track-code serves to divide or separate adjacent tracks from one another. Some compact disc manufacturers further divide these tracks into smaller units, termed indexes, to permit the user to select a particular pre-defined position from within a given track. Typical CD transports utilize the track-start codes to permit the user to switch, either forward or backward, from track-to-track. Some CD transports allow the user to select a particular index within a given track. However, because most compact disc manufacturers do not encode index codes onto the disc, a CD transport which incorporates an index search function is, nevertheless, unable to perform an index search.

In addition, most CD transports not only permit the user to move from track-to-track or index-to-index, but also permit the user to search in either fast-forward or rewind mode while still in the "play" mode, as might be desirable when searching for a particular passage within the music track. While performing such a search the listener will typically hear the music play at a faster rate while searching forward or backward, termed "intra-track scanning".

The typical prior-art CD transport device permits the user to perform track-to-track searching, index searching and intra-track scanning by typically providing momentary contact switches for the user to depress. Typically, the longer a switch is depressed the faster a search, index or scan is performed. An apparent limitation of such a control mechanism is the inherent lack of precision in the control offered, which is most severely noticed when attempting to perform intra-track scanning toward attempting to locate a specific point or passage within a given track or song. The user is often forced to repeatedly depress the control button often "over-shooting" the desired point or passage.

Those CD transports which do provide for intra-track scanning generally allow the digital audio data to continually stream out to the connected amplifier. Because of the increased speed with which the data is flowing, numerous "clicks" and "pops" are generated, which are unpleasant to the ear and potentially damaging to audio components to which the CD transport is connected.

Accordingly, one of the objects of the present invention is to permit the user to easily locate a desired point within a given track without having to repeatedly depress control buttons.

A further object of the present invention is mute the digital audio output signal when searching, indexing and scanning is performed toward minimizing the audibility and potential for damage caused by extraneous clicks and pops which occur during such searching, indexing, and scanning.

These objects, along with other objects, will become apparent in light of the present specification and drawings.

SUMMARY OF THE INVENTION

The present invention is designed to provide advanced searching functions above the normal operations found in prior art CD transports.

The present improved compact disc transport apparatus is capable of receiving a standard compact disc toward reading the digitally encoded information from said compact disc which is processed toward providing audio signals in a digital format together with digital audio control signals.

The CD platform accepts, rotates and positions the compact disk so as to facilitate reading by an optical CD pickup. A CD engine controls the CD platform and the optical CD pickup and serves to format the digitally encoded information as it is read from the compact disc toward providing a digital audio signal output and an audio control signal output. Control means for controlling the CD platform means and the CD engine means is provided where the control means includes control switches for commanding the CD engine to move the optical CD pickup to a desired position on the compact disc. A digital audio signal processor is connected to the CD engine and the control means for processing said digital audio signal from the CD engine. A digital transmission section is connected to the digital audio signal processor and serves to transmit the digital audio signal together with said audio control signal to an external digital audio processing device.

A combination jog-shuttle control is provided wherein the jog control comprises a rotatable jog dial movable in either a clockwise or counter-clockwise direction with no stops. The shuttle control comprises a rotatable shuttle knob having a center detent position and which is rotatable a fixed distance in either a clockwise or counter clockwise direction.

The invention provides jog searching, which allows the user, by spinning a jog dial to move forward or backward on the compact disc to a desired location, located by using displayed information. This search is accomplished by commanding the CD engine to move the CD pickup a fixed amount of time based upon the movement of the jog dial. The movement of the jog dial causes an encoder to generate "clicks", 10 clicks per rotation of the jog dial. The number of clicks generated is stored in a register which is periodically and repeatedly read by the controlling microcontroller which, in turn, senses whether there has been a change from the previous value stored in the register and commands movement of the CD pickup accordingly. The farther the jog dial is turned the more clicks that are generated and thus the farther the CD pickup is moved. Furthermore, the quicker the dial is turned the greater the number of clicks generated in a given period and thus the faster the CD pickup is moved.

The present invention also allows shuttle searching, which provides four searching speeds, both forward and backward, where a given speed is a function of the distance the user turns the shuttle knob from the center detent position.

During both searches, if the CD pickup is engaged, i.e. the CD transport is in the play mode, an internal DSP ramps the output volume-12dB, thus, muting the popping and clicking associated with searching compact discs. Once, the search procedure ends the DSP automatically ramps the volume +12dB thus returning the volume to its previous level.

BRIEF DESCRIPTION OF THE DRAWINGS

FIG. 14 of the drawings is a schematic diagram of the power switch board of the present invention;

FIG. 15 of the drawings is a schematic diagram of the program and cue switch board of the present invention;

DETAILED DESCRIPTION OF THE DRAWINGS

Figure 1:
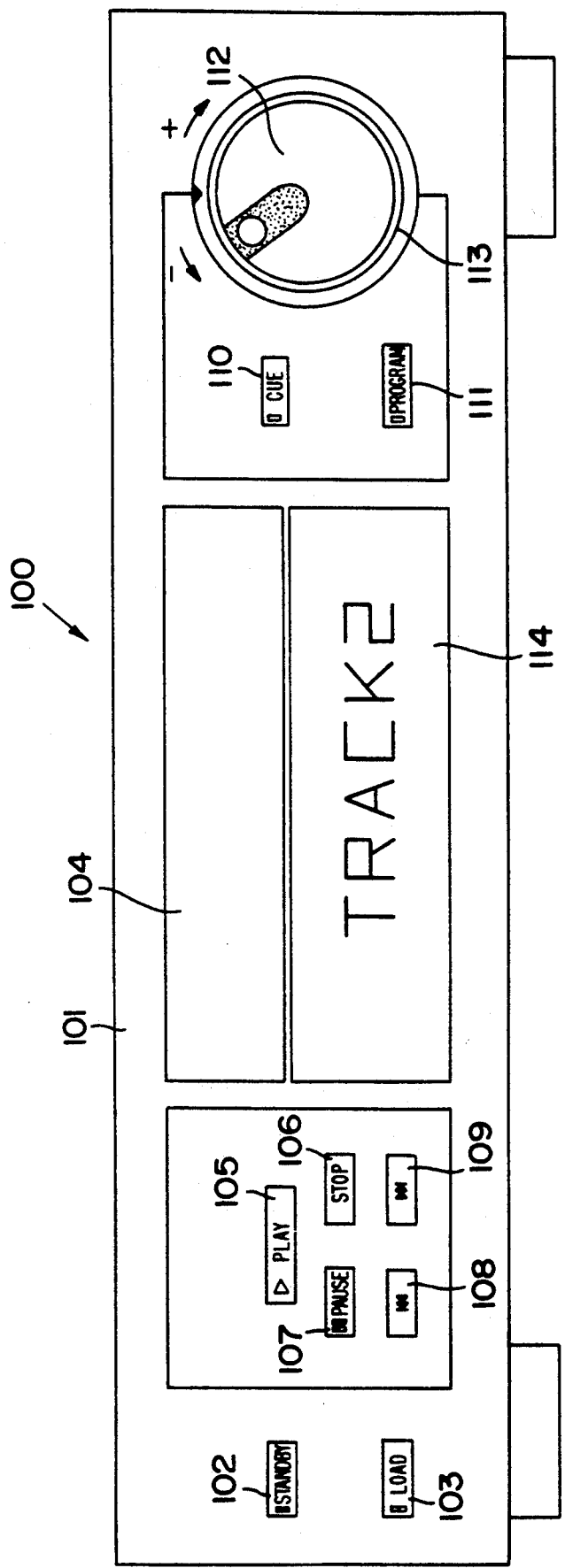
FIG. 1 of the drawings is a front elevational view of the front panel of the present invention illustrating the various controls, vacuum fluorescent display, and LED indicators.

While this invention is susceptible of embodiment in many different forms, one specific embodiment is shown in the drawings and will herein be described in detail with the understanding that the present disclosure is to be considered as an exemplification of the principles of the present invention and is not intended to limit the invention to the embodiment illustrated.

FIG. 1 of the drawings is a front elevational view of front panel 101 of apparatus 100 illustrating the various controls, LED indicators and vacuum fluoresoent display. Standby button 102 is provided for the user to select between an "on" mode or a "standby" mode. Embedded in standby button 102 is a bi-color LED which serves to indicate to the user which one of the possible power states apparatus 100 is currently operating. Load button 103 is used to control the opening and closing of CD drawer 104, which carries the compact disc. Play button 105 is provided for the user to start the CD playing and has an embedded green LED in the shape of a play symbol which is illuminated to indicate that the unit is in play mode. Stop button 106 is provided for the user to stop CD play. During play mode, pause button 107 is alternatively used to interrupt and resume CD play. Pause button 107 has an embedded amber LED which indicates, when lit, that apparatus 100 is in the pause mode. Also during play mode, previous and next track buttons 108 and 109, respectively, select the next or previous CD track for play.

On the right side of front panel 101 is shown jog dial 112 and shuttle knob 113. Jog dial 112 is a quadrature phase, 10 counts per revolution encoder, which is used to control two distinct functions of the improved CD transport apparatus 100. First, when cue button 110 is pressed, its embedded amber LED indicates that jog dial 112 is acting as a cue control. Cuing involves moving the CD pickup through a portion of the CD depending upon the distance and direction that jog dial 112 is turned. The speed at which the user reaches the desired location on the CD depends upon the speed at which jog dial 112 is turned. Spinning jog dial 112 generates, using an encoder, a fixed number of "clicks" per revolution of jog dial 112 which are counted and stored in a data register. In the present embodiment, 10 clicks are generated for every revolution of jog dial 112. This ratio may be altered, thus controlling the resolution of jog dial 112. The data register is periodically and repeatedly read by the microcontroller 220 which, in turn, senses whether there has been a change from the previous value stored in the data register and commands movement of the CD pickup accordingly.

The faster jog dial 112 is spun, the closer together the clicks are generated, and thus the quicker the CD engine moves the CD pickup to the desired point. Jog dial 112 produces two quadrature out of phase outputs whose relative positions indicate whether the dial moved clockwise or counterclockwise. This directional information coupled with the number of clicks generated by the motion of jog dial 112 indicates the next location for the CD pickup.

Once the desired point is reached, the user stops spinning jog dial 112, and the CD engine will play or pause the compact disc depending on the previous state of apparatus 100.

Alternatively, when program button 111 is pressed, its embedded LED indicates that jog dial 112 is acting as a program option selection knob. Again, interrupts are triggered by the spinning of jog dial 112, but these interrupts are serviced differently by the microprocessor because of the activation of program button 111. The user is presented programming options on vacuum fluorescent display (VFD) 114, a 20-character one line display, in the present embodiment. Each option affords the user discrete choices which are selected between by spinning jog dial 112 and pressing program button 111. Among the user's options are the ability to alter display brightness (25%, 50%, 75% and 100%); alter the automation identification number used by the automation port of apparatus 100; choose various information display options that appear on VFD 114 while apparatus is not in programming mode. For instance, VFD 114 can simultaneously display elapsed and remaining time information for the current disc, just the elapsed time or just the remaining time. These choices are scrolled onto VFD 114 by the user's rotation of jog dial 112.

Shuttle knob 113, unlike the concentric jog dial 112, has only one function, searching both forwards and backwards on a disc. Four speeds are provided in each direction and are a function of the distance shuttle knob 113 is rotated from the center detent position. Search direction is dependent on the direction shuttle knob 113 is turned from the center detent position: clockwise will search forward, counter-clockwise backward. Shuttle knob 113 is a mechanical switch comprised of a wiper attached to the knob which can contact any one of 8 discrete contacts. Four contracts are located to the left of detent position and four to the right. As the user turns shuttle knob 113, the knob sweeper engages the first contact. As it is moved further it contacts the second, third and then the fourth contact, with each discrete contact having a unique signal that identifies shuttle knob 113 position to the microcontroller. This unique signal determines the search speed and direction, which is fed to the CD engine in the form of multiple commands to move the CD pickup.

Figure 2:
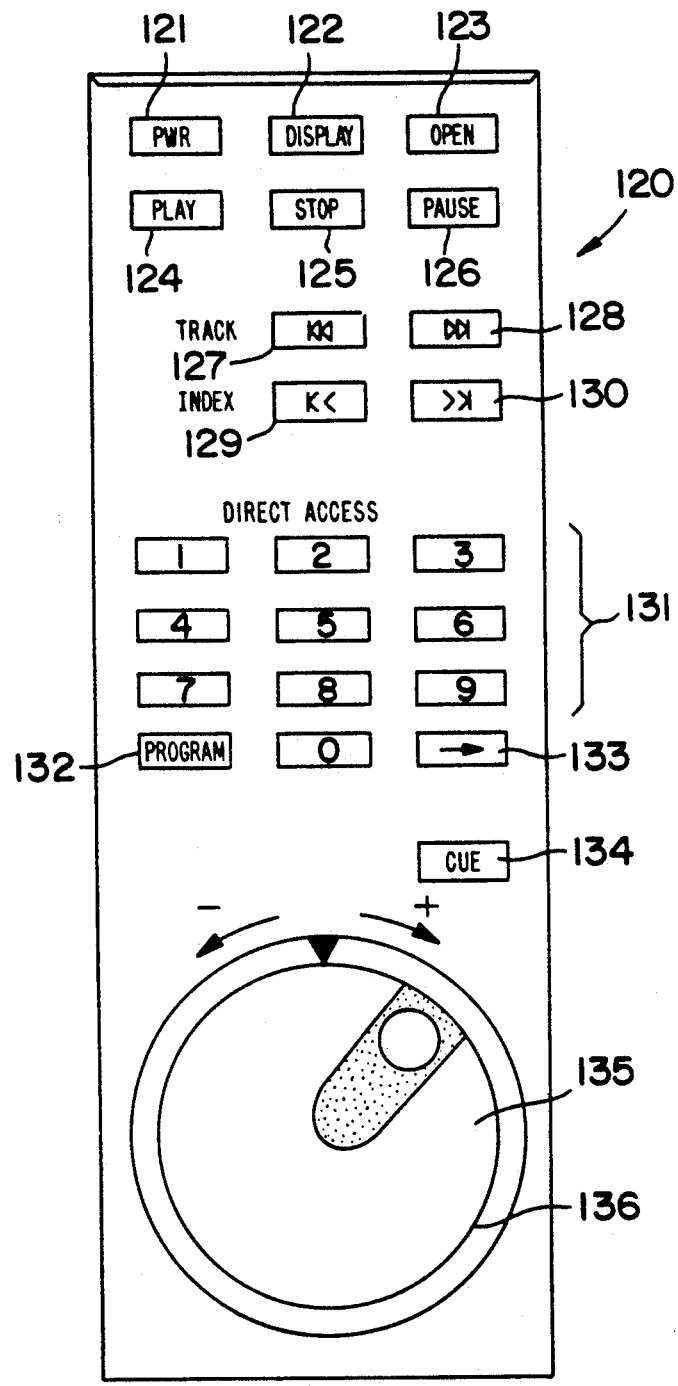
FIG. 2 of the drawings is a front elevational view of the remote control unit of the present invention illustrating various controls.

FIG. 2 of the drawings is a front elevational view of remote control 120 of the improved CD transport apparatus 100. Remote control 120 contains power button 121, display button 122, open button 123, play button 124, stop button 125, pause button 126, previous track button 127, next track button 128, previous index button 129, next index button 130, nine digit key pad 131 with program key 132 and enter key 133, and cue controls 134, 135 and 136 are also included on remote control 120. Remote control 120 interacts with the remote control receiver embedded within front panel 101 (not shown). The integrated infrared detector and preamplifier provides a pulse position modulated waveform which is decoded by the microcontroller. Most of the buttons found on remote control 120 correspond directly to buttons found on front panel 101 with the exception of 9 digit key pad 131 and associated keys 132 and 133.

Figure 3A:
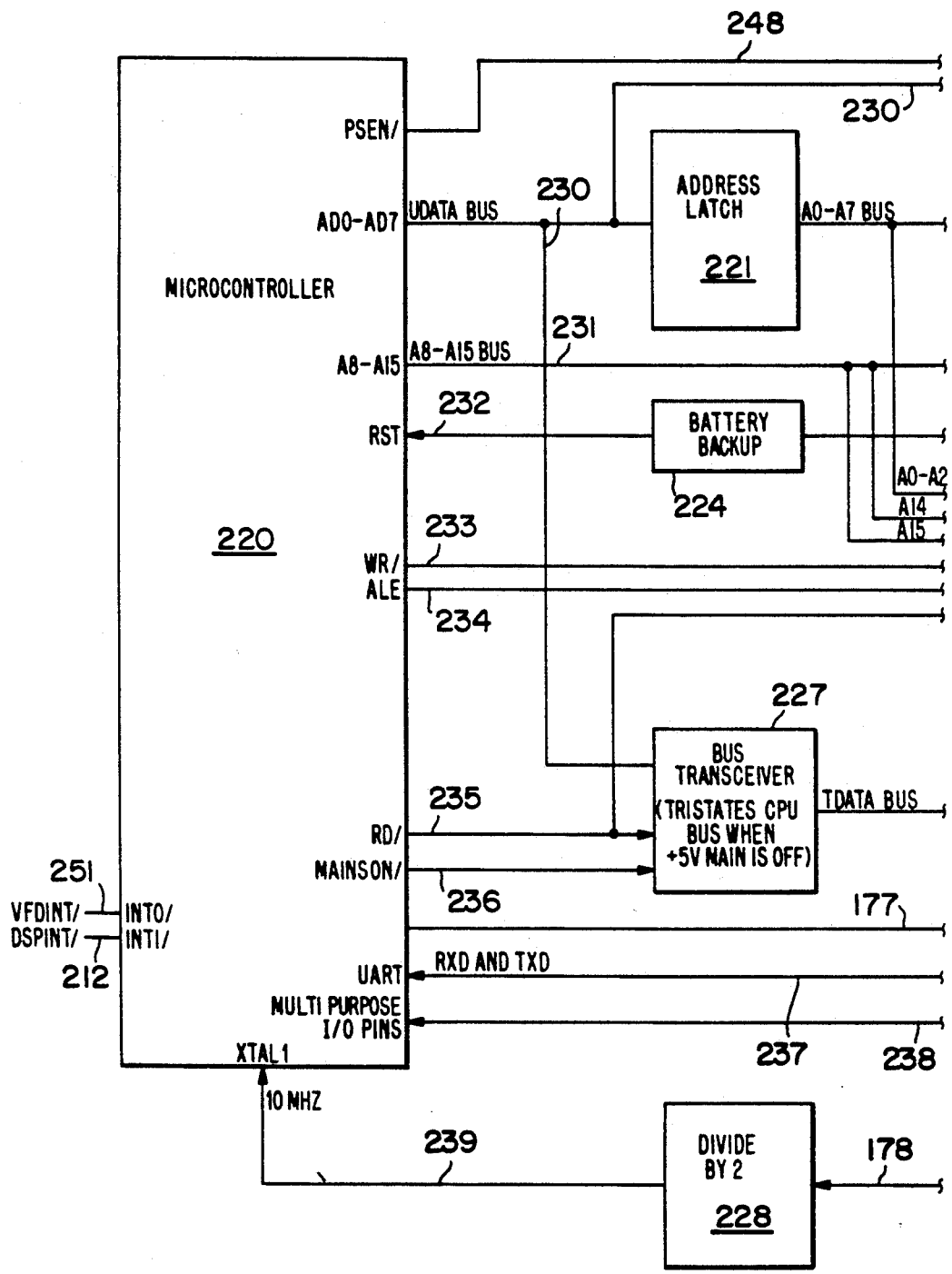
FIG. 3A of the drawings is a portion of a block diagram illustrating the control portion of the present invention.
Figure 3B:
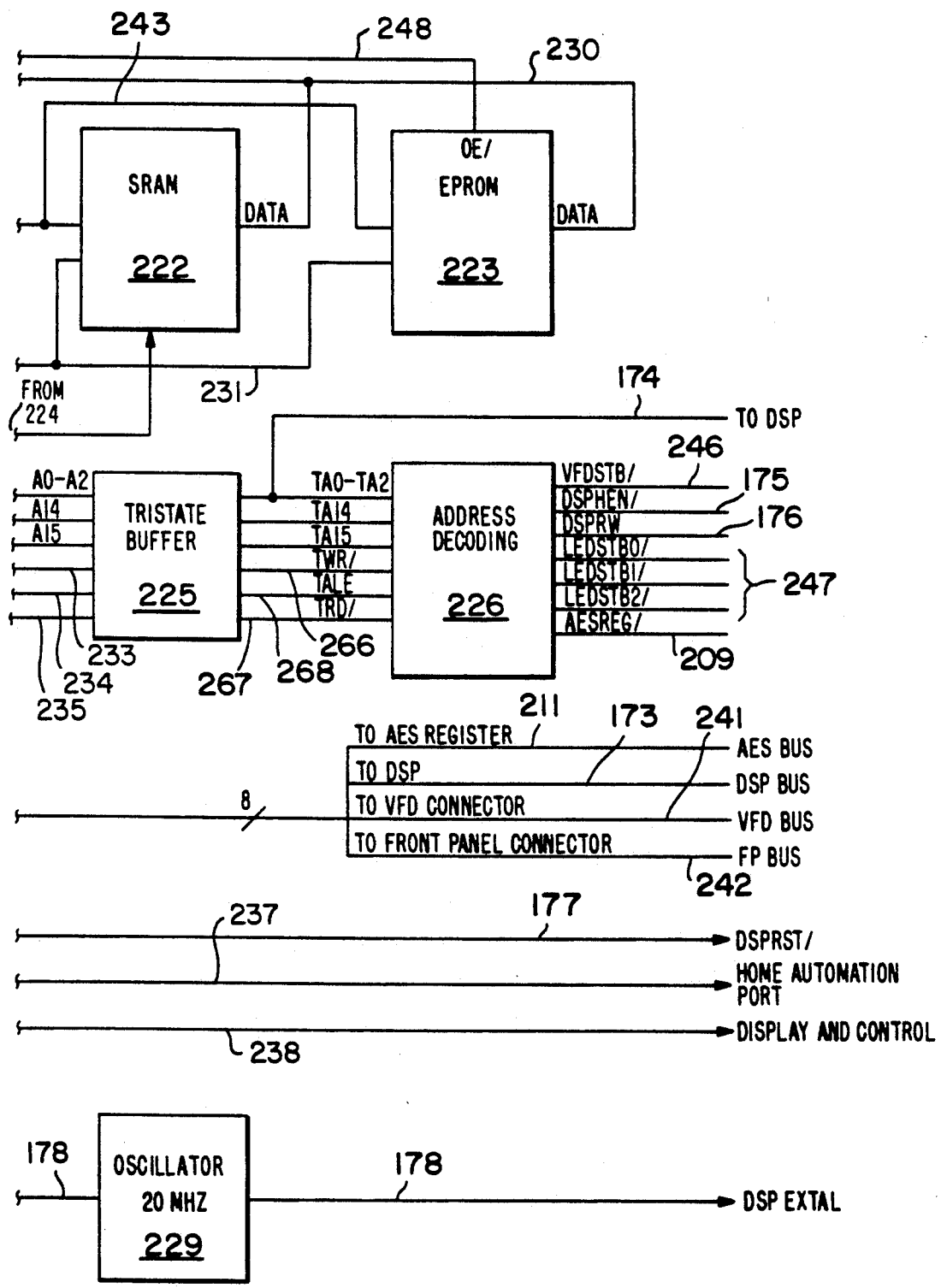
FIG. 3B of the drawings is a portion of a block diagram illustrating the control portion of the present invention.

FIGS. 3A and 3B of the drawings together comprise a block diagram illustrating the control portion of the present improved CD transport apparatus 100. In the present embodiment, microcontroller 220 is a Signetics/Philips 80C552, however, utilization of a similar microprocessor is contemplated and such utilization would require only minor modifications to the present embodiment which would be obvious to one with ordinary skill in the art. Microprocessor 220 is connected to SRAM 222, EPROM 223 and address decoder 226 through two buses. Full access of these devices requires 15 addressing and 8 data bits. In the present embodiment, this number of lines is provided by multiplexing the least significant 8 addressing bits and the 8 data lines onto UBUS 230. The 7 most significant addressing bits utilize AHBUS 231. Using the falling edge of ALE 234, address latch 221 latches the address from UBUS 230 for use in accessing the various devices. By latching the least significant address bits, their value is held constant until the most significant addressing bits and the device enabling signals can be sent and UBUS 230 is free to accept or transmit data. Selection of the desired peripheral device by microcontroller 220 is accomplished by polling the most significant address bit, A15 from AHBUS 231. Where A15 is HIGH, address decoder 226 is "enabled" whereas when A15 is LOW, SRAM 222 is enabled depending upon the status of RD/ 235 and WR/ 233. EPROM 223 selection is handled by PSEN/ 248.

TABLE 1

| Microprocessor Peripheral Mapping | | | | | |
|---|---|---|---|---|---|
| Address Lines | | | | | |
| A15 | A14 | A2 | A1 | A0 | Device |
| 0 | X | X | X | X | SRAM 222 |
| 1 | 1 | X | X | X | DSP 150 |
| 1 | 0 | 0 | 0 | 0 | AES register 161 |
| 1 | 0 | 0 | 0 | 1 | LED latch 340 |
| 1 | 0 | 0 | 1 | 0 | VFD 114 |

For instance, to access the programs contained in EPROM 223, microprocessor 220 places the desired address onto UBUS 230 and AHBUS 231. ALE 234 transitions from HIGH to LOW latching the 8 least significant address bits in address latch 221. Microprocessor 220 now removes the address from UBUS 230 leaving it free for EPROM 223 data. Microcontroller 220 then sends a signal to the output enable of EPROM 223 which cause the appropriate data to appear on UBUS 230. The output enable of EPROM 223 is used to control EPROM 223 rather than the commonly used chip select to greatly reduce EPROM access time. This increase in access performance allows the use of slower EPROMs resulting in a lower part cost for apparatus 100.

SRAM 222 stores the data used by microcontroller 220. The addressing scheme is identical to that used for EPROM 223 in that the least significant addressing bits need to be latche in address latch 221 before accessed to SRAM 222 can be completed. Once the address is available and UBUS 230 is able to send or receive data, SRAM 220's output enable or write enable is brought LOW depending on whether RD/ 235 or WR/ 233 is asserted. The logic used to implement this control is shown in FIG. 5B.

SRAM 222 also utilizes battery backup 224 to ensure the stability of the data in the event of power loss. In the present embodiment, a Mitsubishi M62010 chip is used, although any battery backup capable of delivering a direct current voltage of 3.4 V at 10mA is acceptable for this purpose. Address decoding GAL 226 controls microprocessor 220's access to DSP 150, AES register 161, LED latch 340, and VFD 114. The signals used to control these other devices are VFDSTB/ 246, DSPHEN/ 175, DSPRW 176, LEDSTBO-2/247, and AESREG/ 209. These signals are active when the appropriate address is asserted and TWR/ 266 is LOW (indicating microprocessor write). Display and control 238 contain the signals which are sent to LED driver 340 (shown in FIG. 12) and the front panel switch matrix.

Oscillator 229 is a 20 Mhz low noise oscillator which is used to clock both DSP 150 and microcontroller 220. The output of oscillator 229 is fed directly to DSP 150 which requires the 20 Mhz clock signal, whereas the output of oscillator 229 is fed into a divide-by-two circuit 228 resulting in an approximately 10 Mhz clock 239 which is fed into microcontroller 220.

Tri-state buffers 225 and 227 are both enabled by MAINSON/236. These tri-state buffers serve to protect any unpowered CMOS chips from damage that can be caused by active inputs powering the chip. MAINSON/ 236 indicates when apparatus 100 is in active mode (i.e. main power is being provided to the VCC pins on the sensitive chips). Tri-state buffer 225 is located between microcontroller 220 and addressing GAL 226 and handles the following signals: ALBUS 243; AHBUS 231; WR/ 233; ALE 234; and RD/ 235. Buffer 225, in the present embodiment, is a Texas Instruments 74AC244, although any buffer with tri-state outputs could be substituted. Tri-state buffer 227 is located between microcontroller 220 and the buses connected throughout the apparatus 100. Therefore, the present embodiment utilizes a Texas Instrument's 74AC245 tri-state bus transceiver to enable the bus signals to remain stable while fanning out to a large number of devices. Buffer 227 passes only UBUS 230's information onto DSP 150, VFD 114, front panel 101 and AES register 161.

Figure 4A:
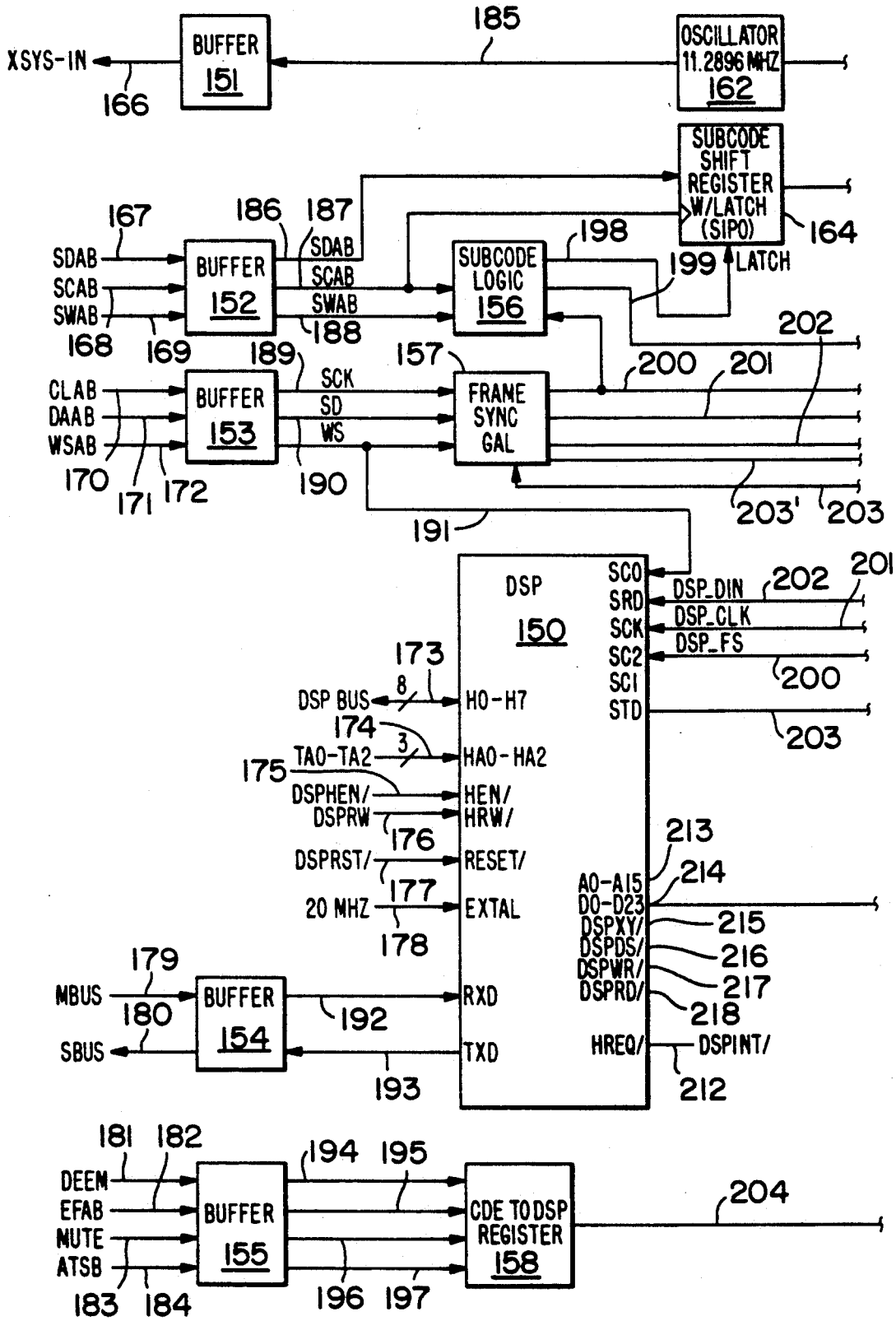
FIG. 4A of the drawings is a portion of a block diagram illustrating the audio acquisition and processing portion of the present invention.
Figure 4B:
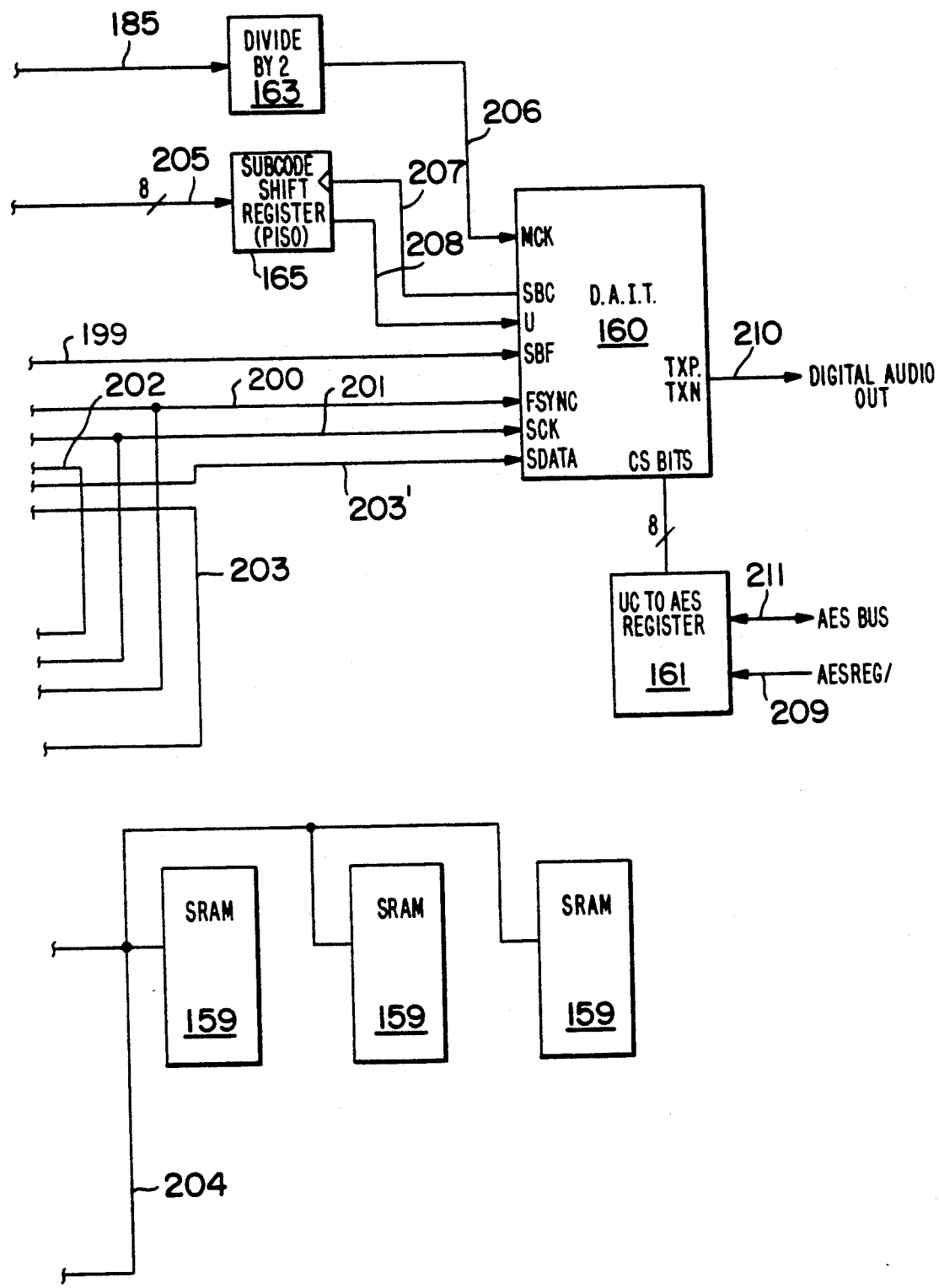
FIG. 4B of the drawings is a portion of a block diagram illustrating the audio acquisition and processing portion of the present invention.

FIGS. 4A and 4B of the drawings together comprise a block diagram illustrating the audio processing portion of the present improved CD transport apparatus 100. In the disclosed embodiment of the invention, the front end of apparatus 100 is a Philips CD engine. The CD engine positions the compact disc, rotates the compact disc, positions the laser pick-up and reads the digitally encoded data. The CD engine is responsible for translating microprocessor commands into control signals for the reading of the compact discs. The CD engine is clocked by XSYS-IN 166, the buffered version of the 11 Mhz clock signal generated by oscillator 162 and buffered in tri-state buffer 151. The CD engine is also connected to the remainder of apparatus 100 through a number of connections which will be explained in light of the function of the improved CD transport.

Digital audio data from the CD engine is fed into the backhalf of apparatus 100 in Inter IC Sound Bus (I$^2$S) format, which is a standard serial data bus format composed of three signals: DAAB 171, the digital audio data; CLAB 170, a continuous serial clock, which clocks the DAAB 171 bitstream; and WSAB 172, a word select signal for separating left and right channel data. These signals are fed into tri-state buffer 153, which is tri-stated when apparatus 100 is in "standby" mode. When apparatus 100 is "on", these signals are passed through to Frame Sync GAL 157, which provides the proper signals to the SSI port of DSP 150. Frame Sync GAL 157 reclocks CLAB 170 as DSP_CLK 201 to reduce jitter in clocking the data into DSP 150. Frame Sync GAL 157 also generates DSP_FS 200, which signals to DSP 150 the start of a new audio data word. This framing signal is 1 clock cycle wide and flags the most significant bit (MSB) of the audio data stream, DSP_DIN 202. Once this occurs, DSP 150 shifts in DSP_DIN 202 in bitwise fashion requiring 24 clock periods to complete the transfer into one of the DSP 150's internal registers.

DSP 150 is a digital signal processor driven by 20 Mhz$_{13}$ CLK 178 which is available only when MAINSON/ 236 is LOW to protect the DSP circuitry. Microprocessor 220 (shown in FIG. 3A) resets DSP 150 through DSPRST/ 177 and then begins to download programs to DSP 150. In the present embodiment, DSP 150 is a Motorola DSP 56001, selected for its versatility and 24 bit audio word width. Due to a timing characteristic inherent in the Motorola DSP 56001 the least significant digital audio data bit is not useable in the present apparatus. Accordingly, only 23 bit audio word width is used, with the least significant bit being tied to ground. DSP 150 is operated in Mode 1 which allows the DSP to be programmed through DSPbus 173, an 8 bit wide bi-directional data bus. The programs and coefficient tables are downloaded from microprocessor 220 (shown in FIG. 3A) directly into the eight internal registers that are directly addressed by 3-bit wide TAbus 174. This information is then loaded into the 512×24 bits of internal storage in DSP 150 by internal transfers, as disclosed in the Motorola DSP 56001 Technical Data Disclosure. Among the programs downloaded to DSP 150 are provisions for the command interrupt handlers; timer tick interrupt handler for DSP to microprocessor communication; and smooth volume ramping to mute the digital audio signal during searching.

DSP 150 ramps the digital data volume down to −12dB to mute the output during searching to minimize the "popping" and other unpleasant audio noises associated with such searches. This process begins when the user searches a compact disc using jog dial 112 or shuttle knob 113. Once microprocessor 220 receives the jog search interrupt, it instructs DSP 150 to ramp the volume down −12dB. DSP 150 accomplishes this task by digitally multiplying the digital audio data, located in its internal buffer, by constants which ramp the gain downward in steps. This function is applied iteratively until −12dB is reached. Once the search has been completed, microprocessor 220 signals DSP 150 to ramp the volume back up +12dB in a similar step-wise fashion.

After processing in DSP 150, the digital audio data is fed into framing GAL 157 on DSPSTD 203, which in turn, feeds the digital audio data into DAIT 160 on NDAAB 203' in I$^2$S format. In the present embodiment, DAIT 160 is a Crystal Semiconductor CS8402 Digital Audio Interface Transmitter, which is responsible for transmitting the data processed by DSP 150 in a signal format conforming to the AES/EBU digital audio interface standard to external audio components. The CS8402 was chosen because of its 24-bit width which eliminates the need to truncate the audio digital data sent from DSP 150 which is also 24 bits wide (23 bits of actual data plus Least Significant Bit of Zero). DAIT 160, after altering the I$^2$S format into AES/EBU digital audio interface format, outputs the digital audio data on DADO 210 which is offered in a number of output formats including coaxial, balanced (XLR) output, TOSlink, and AT&T type-ST output (as shown in FIG. 7B). DAIT 160 is clocked by MCK 206, the clock signal from oscillator 162 after it is divided in half by divide-by-two circuit 163. DAIT 160 also receives channel status information from AES register 161. AES register 161 is a latch, which can be implemented using a Texas Instruments 74AC574, that passes information from microcontroller 220 (shown in FIG. 4) to DAIT 160 through AES bus 173.

DSP 150 utilizes information from various external sources in processing the data from Frame Sync GAL 157 such as CDE-DSP register 158, SRAM 159 and tri-state buffer 154. Accessing CDE-DSP register 158 and SRAM 159 is done through DSPbus 204. The most significant address bit indicates where DSP 150 is currently seeking information. When the MSB is LOW, DSP 150 is accessing SRAM 159. DSP 150 utilizes SRAM 159 to store various data during the processing of the digital audio data from Frame Sync GAL 157. SRAM 159 is 24 bits×32K. The information contained in CDE-DSP register 158 corresponds to information transmitted by the Philips CD engine to tri-state buffer 155, which is tri-stated when apparatus 100 is in standby mode.

During normal "on" mode, the following information is passed through buffer 155 from the CD engine to CDE-DSP register 158 in anticipation of DSP access. DEEM 181 is the de-emphasis flag from the CD engine indicating that the corresponding digital audio words needs to be de-emphasized. EFAB 182 is the error flag from the CD engine indicating that the current digital audio word is incorrect and therefore error correction is required. Mute 183 is the mute indicator, indicating that the current audio digital audio word needs to be muted. ATSB 184 is the attenuation indicator thus indicating that the current digital audio word must be attenuated by apparatus 100.

The Philips CD engine outputs subcode information in "parallel" with the digital audio data (DAAB 171) and the audio control bits (DEEM 181, EFAB 182, MUTE 183 and ATSB 184). These subcode signals are output in a format similar to I$^2$S in that there are three separate signals: SDAB 167, is the serial subcode data; SCAB 168, the burst clock; and SWAB 169, which indicates the end of the serial subcode data burst. SDAB 167 is a ten bit data burst which includes one parity bit, one error bit, one sync bit, and seven data bits. The Philips CD engine supplies the SDAB 167 data beginning with a LOW sync bit for two subcode data bits, indicating the start of a subcode data block. Once this signal is received, apparatus 100 begins to look for serial subcode data on SDAB 167 which is fed through tri-state buffer 152 into serial-to-parallel register 164.

Serial-to-parallel register 164 is responsible for the serial to parallel conversion of the subcode data bursts. This is accomplished, in the present embodiment, through the use of a Texas Instruments 74HC595 serial to parallel shift register. The parallel data is then latched on the rising edge of buffered_SWAB 188. The latch used in subcode logic 156 need be only eight bits wide to latch the seven data bits and one sync bit, which is then passed to DAIT 160 through Ubit 208. Once the serial subcode data is latched, subcode logic 156 utilizing a GAL (shown in FIG. 7A) performs a number of operations depending upon the status of the sync bit. When the sync bit is HIGH, the GAL will clock out a start bit followed by the data bits which are stored in the latch. Where the sync bit is LOW, the GAL clocks out a zero for each FSYNC 200 pulse received until the next subcode word is latched in the subcode logic latch. The GAL located in subcode logic 156 also clocks out zeros once it is finished clocking out its last subcode data word, while it waits for the next subcode data word to arrive from the Philips CD engine through tri-state buffer 152. The DAIT 160 receives the subcode data through Ubus 208 after the GAL operations. This information is then fed out to other audio components following apparatus 100 in AES/EBU format along with the digital audio data.

In an alternative embodiment of the invention tri-state buffers 151-155 may be omitted and are not shown in the schematic diagrams comprising FIGS. 6 and 7.

MBUS 179 is the serial communication port from the CD engine which communicates CD engine status data to the remainder of apparatus 100. SBUS 180 is an asynchronous serial bus which carries the communications from the back end of apparatus 100 to the CD engine. Each transfer along SBUS 180 consists of one start bit, eight data bits, one command/data bit, and one stop bit, which is transmitted at 62,500 baud. The command/data bit indicates if a command byte or data byte is transmitted (commands are indicated by command/data bit HIGH). Each communication along SBUS 180 consists of a transfer of one command byte and zero or more data bytes. If one or more data bytes are transferred, a checksum is added (this checksum is the arithmetic addition of all previous data bytes). This protocol complies with the Philips servomicroprocessor application data sheet specification to which further reference can be made.

Figure 5A:
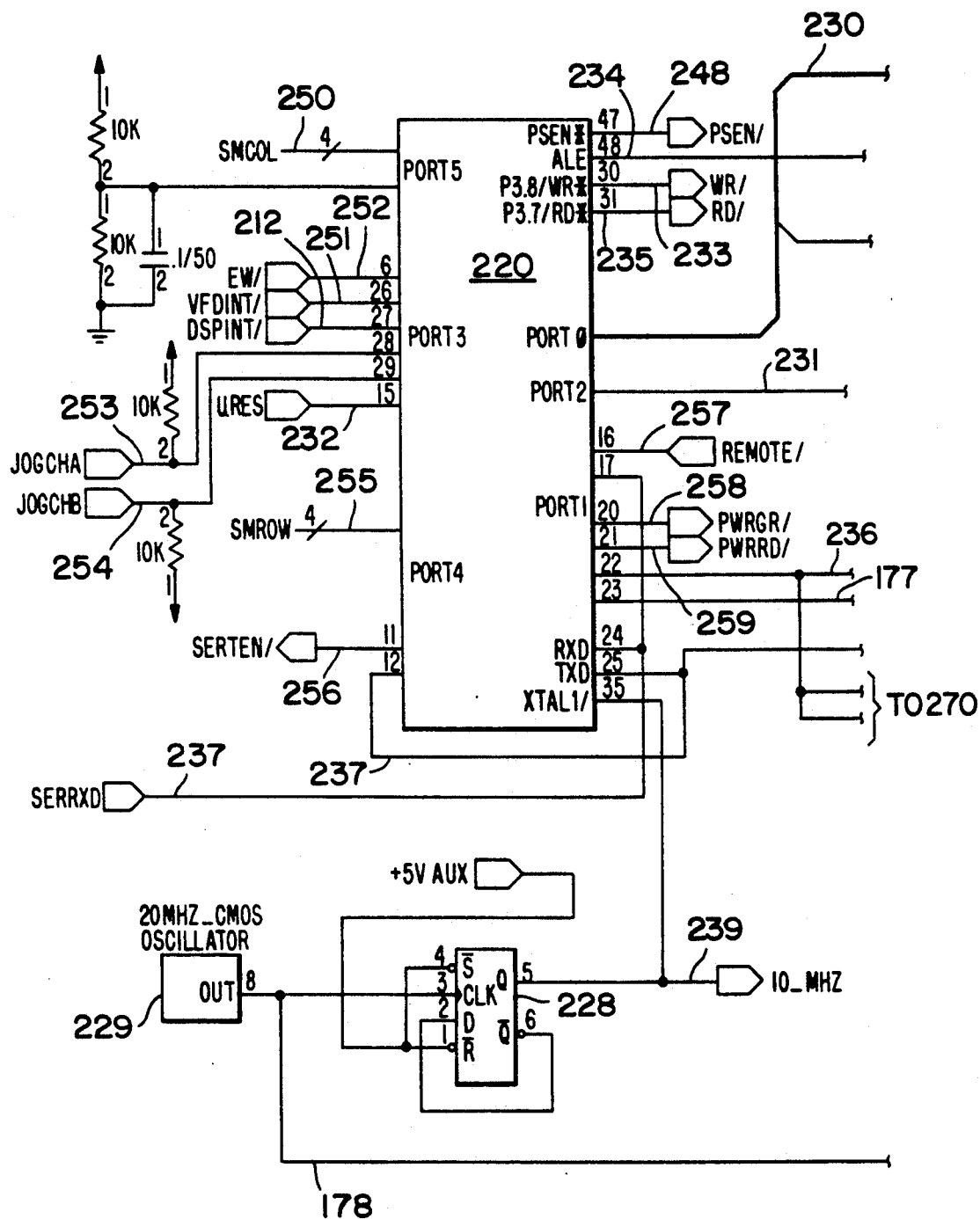
FIG. 5A of the drawings is a portion of a schematic block diagram illustrating the microprocessor, ROM, RAM, tri-state buffers, and the decoding GAL of the present invention.
Figure 5B:
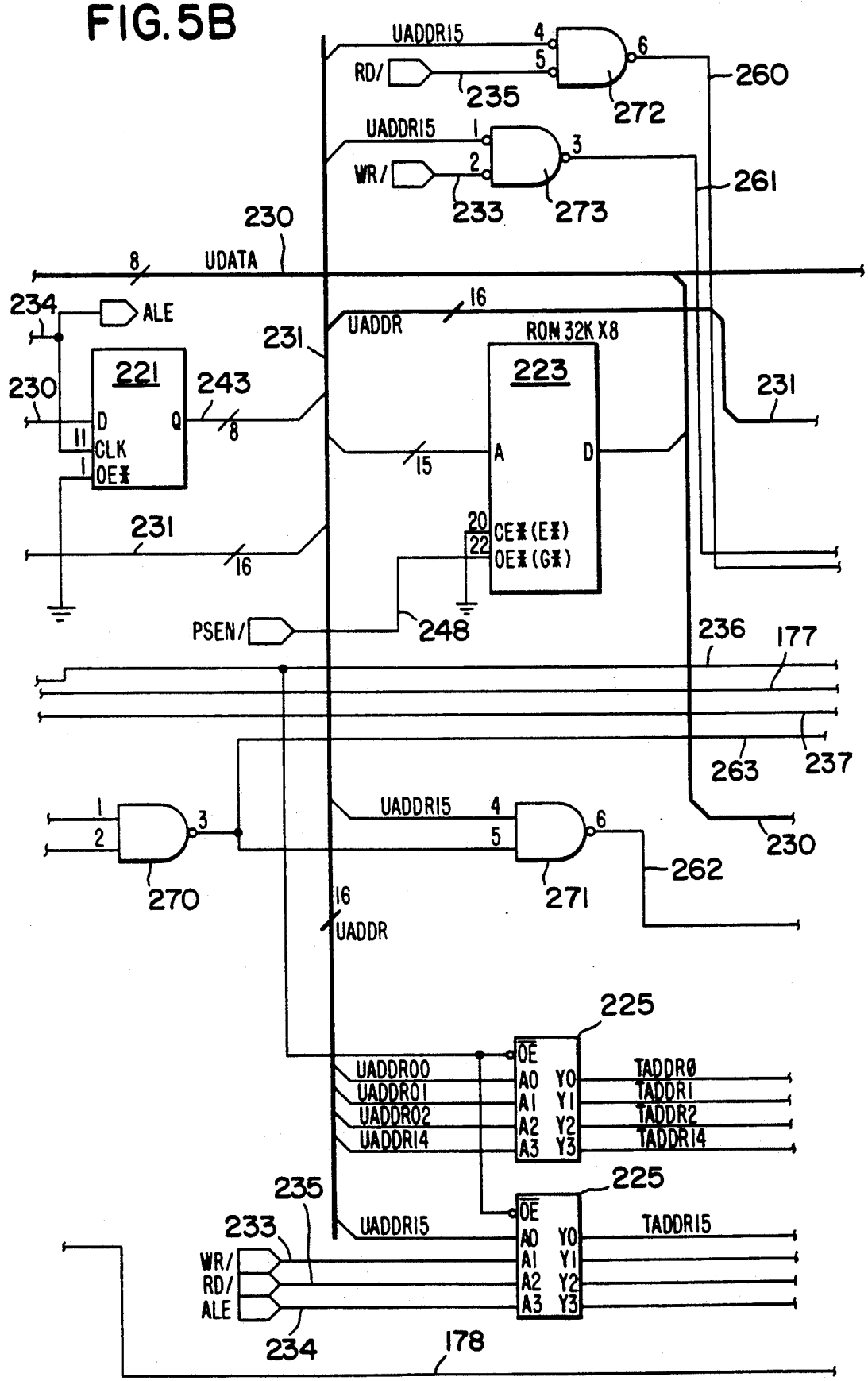
FIG. 5B of the drawings is a portion of a schematic block diagram illustrating the microprocessor, ROM, RAM, tri-state buffers, and the decoding GAL of the present invention.
Figure 5C:
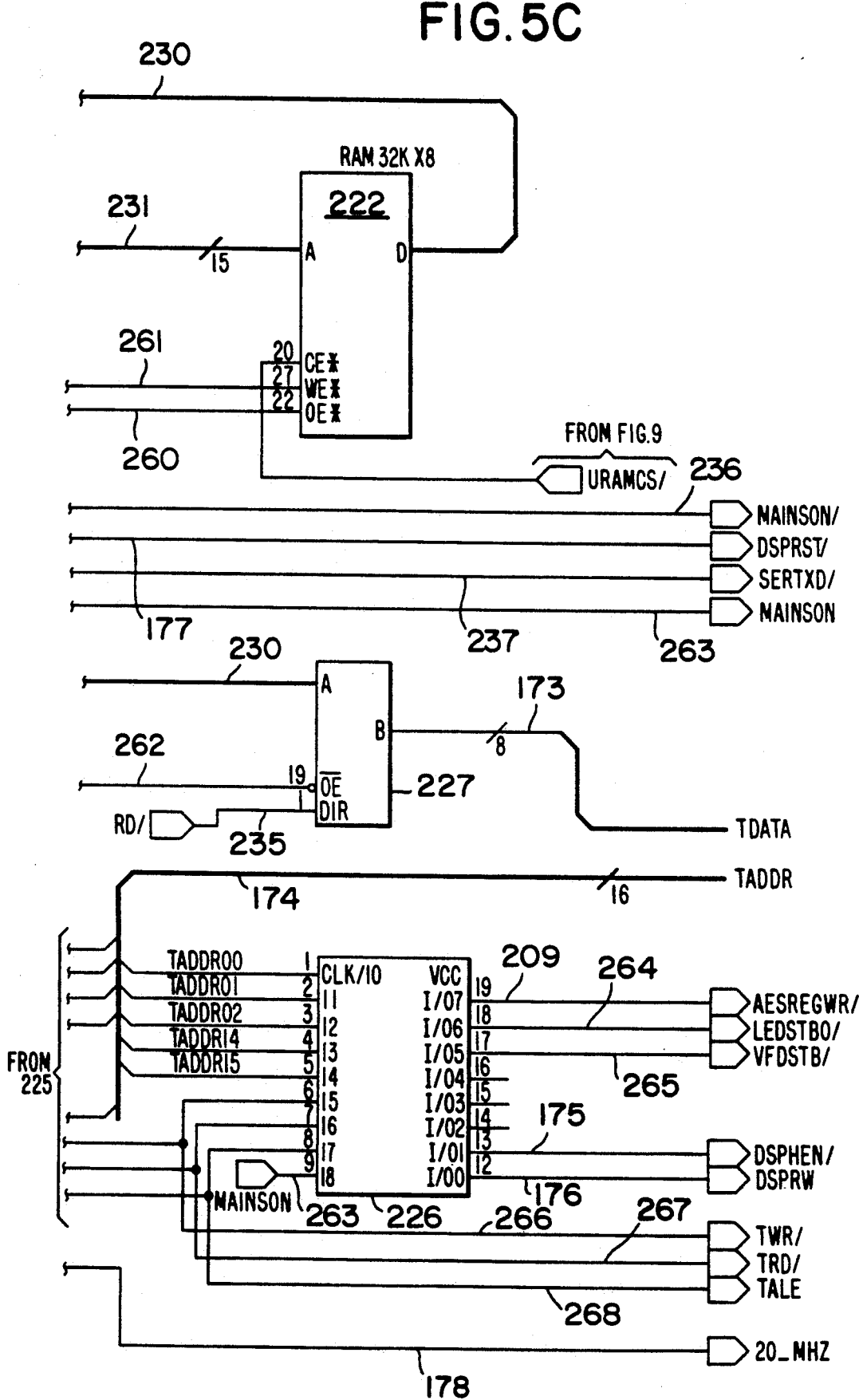
FIG. 5C of the drawings is a portion of a schematic block diagram illustrating the microprocessor, ROM, RAM, tri-state buffers, and the decoding GAL of the present invention.

FIGS. 5A, 5B and 5C of the drawings together comprise a schematic diagram of the control portion of the present improved CD transport apparatus 100. Oscillator 229 is a 20 Mhz crystal oscillator used as the master system clock for apparatus 100. MSCLK 178, the 20 Mhz square wave output generated by oscillator 229 is fed directly into divide-by-two circuit 228 and DSP 150 (shown in FIG. 4A). Divide-by-two circuit 228 is an SR flip-flop configured to operate as a T-type flip-flop, so that every time MSCLK 178 is HIGH the flip-flop toggles, thus, dividing MSCLK 178 by two. 10Mhz CLK 239 is the result of this division and is used to clock microcontroller 220. Microcontroller 220 in the present embodiment is a Signetics/Philips 80C552, however, use of other similar microprocessors would be obvious to one with ordinary skill in the art. Microcontroller 220 monitors and operates front panel 101; controls automation port 237, the servo-controller contained in the CD engine, and DSP 150; and monitors internal status and fault signals.

Microcontroller 220 is connected to external memory, front panel 101, DSP 150, AES register 161, and the CD engine. External memory—comprised of SRAM 222 (32K×8 bit Static Random Access Memory), EPROM 223 (32K×8 bit Erasable Read Only Memory), and address latch 221 (an 8 bit latch)—is accessed through PSEN/ 248, ALE 234, RD/ 235, WR/ 233 and two buses, UBUS 230 and AHBUS 231. PSEN/ 248 is the program read strobe generated by microcontroller 220 to request program data from EPROM 223. PSEN/ 248 is connected to the output enable of EPROM 223 to enable the placement of program data onto UBUS 230 for use by microcontroller 220. ALE 234 is connected between microcontroller 220 and the clock pin of address latch 221. The falling edge of ALE 234 is used to latch the least significant 8 bits of a memory address into address latch 221.

Access to SRAM 222 requires the most significant bit from AHBUS 231 to be LOW and the assertion of either the memory read or write signal. RD/ 235, the memory read signal, and the most significant address bit from AHBUS 231 are fed into OR gate 272 the output of which is fed into the output enable of SRAM 222 to enable the output of SRAM data onto UBUS 230. WR/ 233, the memory write signal, and the most significant address bit from AHBUS 231 are fed into OR gate 273 the output of which is fed into the write enable of SRAM 222 to enable the writing of the data on UBUS 230 into SRAM 222.

UBUS 230 is an 8 bit bus connecting port0 of microcontroller 220 with address latch 221, SRAM 222, EPROM 223 and bus transceiver 227. Port0 both transmits and receives data and transmits the 8 least significant addressing bits. Microcontroller 220 multiplexes these two distinct types of signals onto port0 and provides ALE 234 to allow the latching of address data, when UBUS 230 contains address bits. The second bus used by microcontroller 220, AHBUS 231, carries the 8 most significant addressing bits directly to SRAM 222 and EPROM 223. Since address latch 221 is always output enabled, the least significant address bits are available on ALBUS 243 after the falling edge of ALE 234. The addressing bits on ALBUS 243 are fed along with the most significant address bits from AHBUS 231 into SRAM 222 and EPROM 223, to form the 16 bit address that microcontroller 220 seeks to access.

After the desired address is available at SRAM 222 and EPRO 223 for a time sufficient to ensure the correct location is accessed (the time required is a function of the SRAM and EPROM used in the embodiment), the desired control signal (WR/ 233, RD/ 235, or PSEN/248) is applied by microcontroller 220. Depending upon the control signal issued by microcontroller 220, data is sent along UBUS 230 by either microcontroller 220, SRAM 222 or EPROM 223 and is received by either microcontroller 220 or SRAM 222.

Beside its external memory, microcontroller 220 is also connected to DSP 150, AES register 161, VFD 114, and the front panel LEDs. These connections are all made through tri-state buffers to protect various CMOS components during power-up. Microcontroller 220 sends and receives data on UBUS 230 through bus transceiver 227, a bidirectional bus transceiver with output TDATA bus 173. Bus transceiver 227 is controlled by an output enable and direction signal. The output enable 262 is fed by NAND gate 271, whose inputs are the most significant address bit from AHBUS 231 and the output of NAND gate 271, which is configured to invert MAINSON/ 236 into MAINSON 263. So, whenever main power is enabled, MAINSON 263 is HIGH, and UADDR15, the most significant bit of AHBUS 231, is HIGH, then microcontroller 220 is tryinq to access a peripheral device. The direction of bus transceiver 227 is controlled by RD/ 235. For instance, when RD/ 235 is LOW, microcontroller 220 receives data through UBUS 230, which was sent by the addressed peripheral along TDATA bus 173 through bus bi-directional bus transceiver 227.

Addressing the desired peripheral is accomplished through decoding GAL 226 and associated components. Decoding GAL 226 decodes buffered address bits and buffered control signals, to select individual peripheral devices, such as DSP 150, LED driver 340, or AES register 161. These buffered signals are buffered by tri-state buffers 225, which buffer a subset of ALBUS 243 and AHBUS 231, as well as, microcontroller 220 control signals ALE 234, RD/ 233, and WR/ 235. Decoding GAL 226 receives the outputs of tri-state buffers 225 on TAbus 174, TWR/ 266, TRD/ 267, and TALE/ 268. TRD/ 267 is the buffered version of RD/ 235. TWR/ 266 is the buffered version of WR/ 233. TALE 268 is the buffered version of ALE 234. All of the address lines fed into buffers 225 are also fed into decoding GAL 226.

Microcontroller 220 controls DSP 150 through a number of signals. At power up, microcontroller 220 will reset DSP 150 through the assertion of DSPRST/ 177. Then microcontroller 220 downloads the DSP programming from EPROM 223 through TDATA bus 173. After, DSP 150 is selected by assertion of DSPHEN/ 175, microcontroller 220 can send data and information to the host port. DSPRW 176 is the DSP read/write signal which instructs DSP 150 to read the data located on TDATA bus 173 or write data onto TDATA bus 173. Once the programming is completed, normal operations begin with communications continuing along the same data and control lines and DSP 150 issuing interrupts on DSPINT/ 212 to microcontroller 220.

Microcontroller 220 receives user input in the form of interrupts from front panel 101 through inpuis connected to microcontroller ports 3, 4 and 5. Many of the input buttons found on front panel 101 are configured in a matrix arrangement to minimize the number of connections to microcontroller 220. The arrangement is such that each matrix switch has a unique rowcolumn value corresponding to it. SMCOL 250 are the four column signals, while SMROW 255 are the four row signals that indicate which button has been pressed. JOGCHA 253 and JOGCHB 254 are the two outputs of the quadrature phase, 10 counts per revolution encoder connected to jog dial 112 located on front panel 101. By determining the phase difference between JOGCHA 253 and JOGCHB 254, microcontroller 220 can determine whether to instruct the CD engine to "jog" forward or backward. The number of clicks on JOGCHA 253 and JOGCHB 254 indicate the distance to jog.

Microcontroller 220 also controls the LEDs and VFD 114 located on front panel 101. VFDSTB/ 265, which is generated by decoding GAL 226 based on commands from microcontroller 220, indicates to VFD 114 that the data on TDATA bus 173 is intended for display. While the driver is busy, it asserts VFDINT/ 251, which is fed directly into microcontroller 220 indicating that it should hold any command for VFD 114 until the driver can complete the current command. Microcontroller 220 also services all the LEDs through LEDSTB0/ 264 (through decoding GAL 226) and TDATA bus 173 in a similar manner, except there is no need for interrupts in this path. Finally, microcontroller 220, controls the bi-color LED used in association with power button 102 through PWRGR/258 and PWRRD/ 259. Each signal drives an independent, color LED (green and red, respectively).

There are two external control signal sources which microcontroller 220 recognizes. Microcontroller 220 is connected directly to the automation port of apparatus 100. This port allows an external microcontroller to send instructions to apparatus 100. SERRXD-TXD 237 is the bi-directional serial data line connected through an RS-232 or RS-485 port, through which microprocessor 220 receives and sends serial data. SERTEN/ 256 is the serial transmit enable, which activates a standard RS-485 interface for transmission. Microcontroller 220 is also directly connected to an integrated infrared detector/preamplifier embedded in front panel 101, which receives signals from hand-held remote control unit 120. REMOTE/ 257 is the pulse position modulated waveform generated by the detector, which is decoded by microcontroller 220.

Figure 6A:
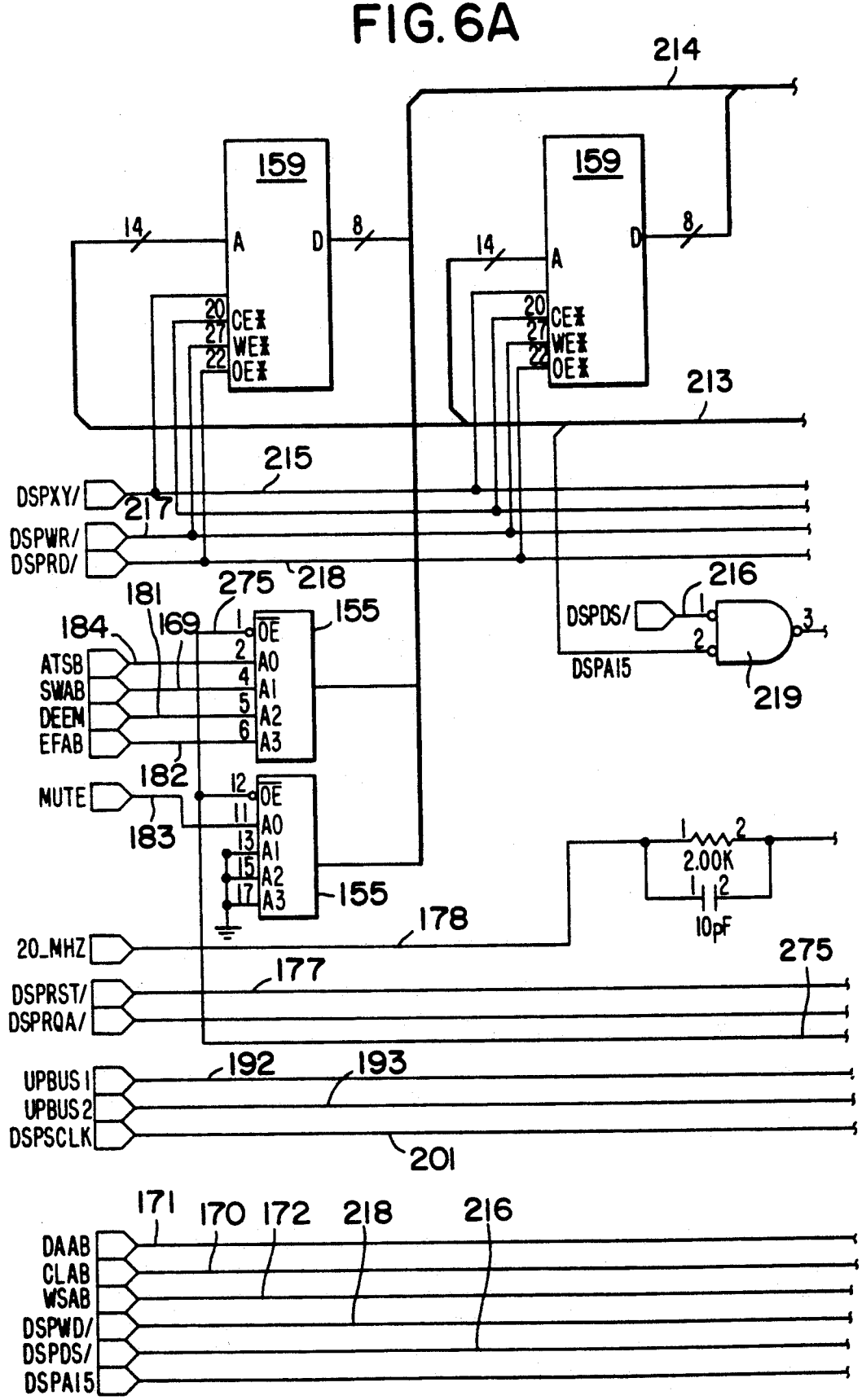
FIG. 6A of the drawings is a portion of a schematic block diagram illustrating the DSP, RAM, CDE status register, and framing GAL used in the audio processing portion of the present invention.
Figure 6B:
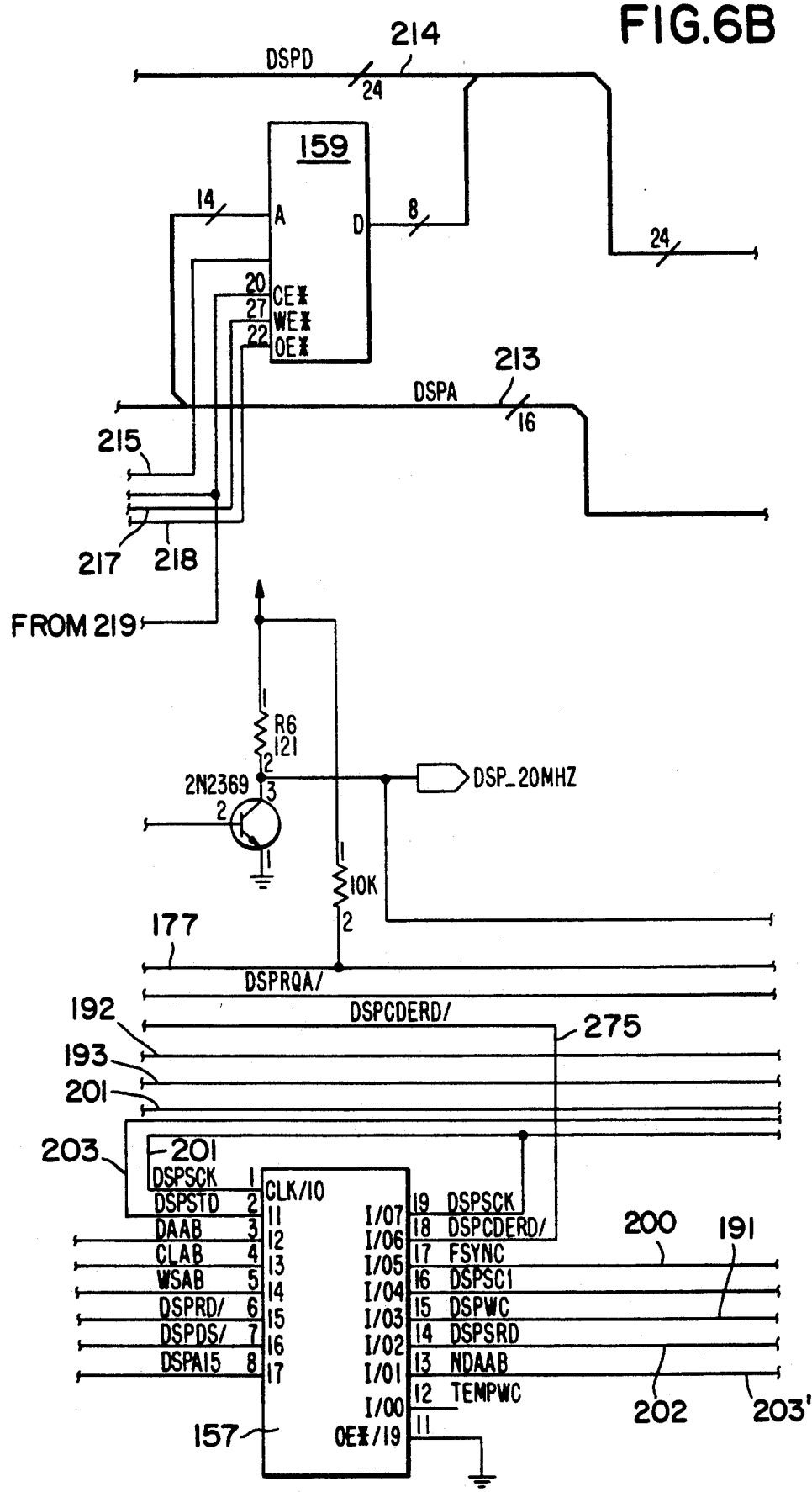
FIG. 6B of the drawings is a portion of a schematic block diagram illustrating the DSP, RAM, CDE status register, and framing GAL used in the audio processing portion of the present invention.
Figure 6C:
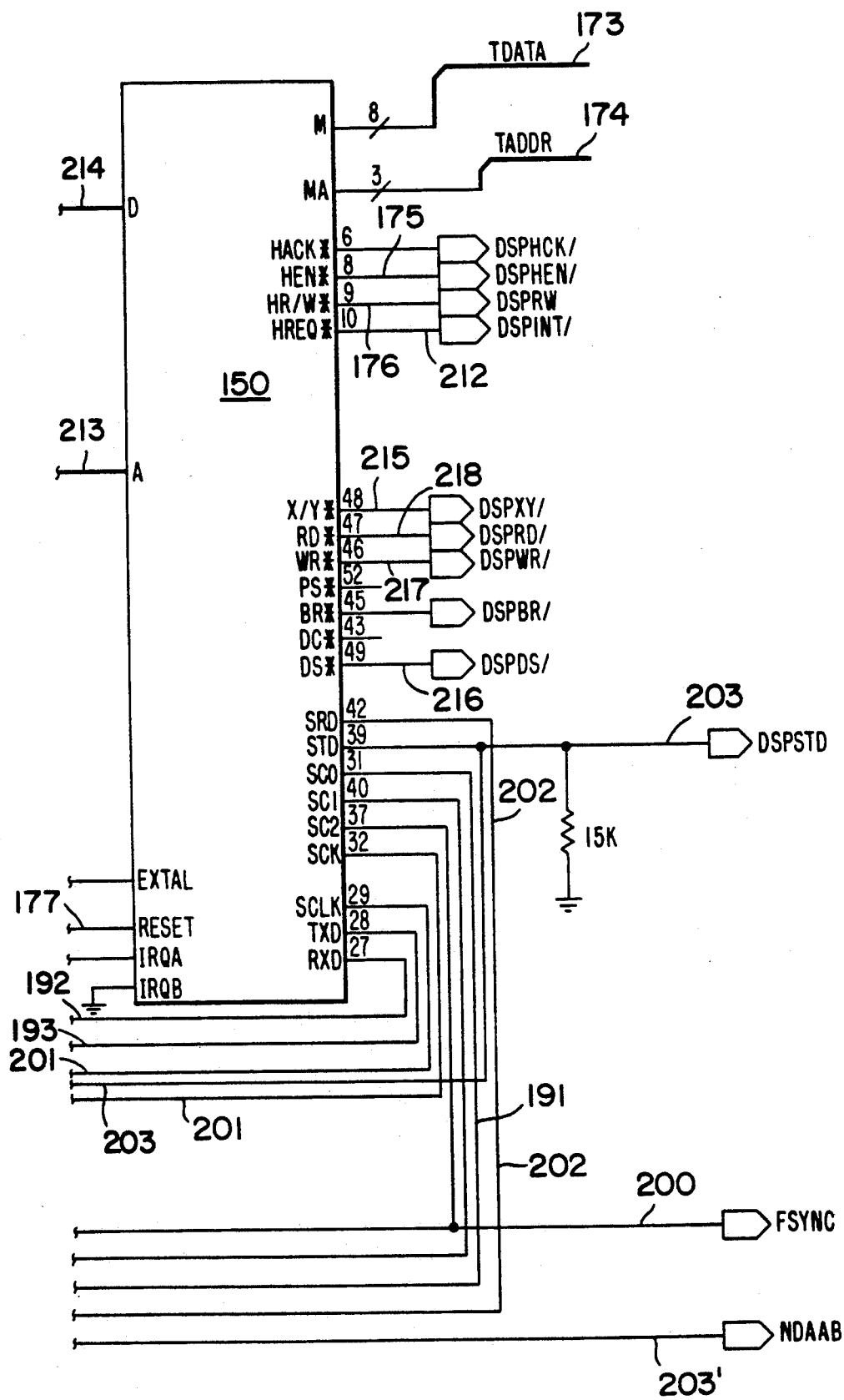
FIG. 6C of the drawings is a portion of a schematic block diagram illustrating the DSP, RAM, CDE status register, and framing GAL used in the audio processing portion of the present invention.

FIGS. 6A, 6B and 6C of the drawings together comprise a schematic diagram of the Digital Signal Processor portion of the present improved CD transport apparatus 100. In the present embodiment, DSP 150 is a Motorola DSP56001. Although similar programmable digital signal processors can be used, the Motorola chip was selected due to its wide word length (24 bits suitable for audio data). DSP 150 is operated in Mode 1, in which it can be bootstrapped through its host port by microprocessor 220. When DSPRST/ 177 is LOW, DSP 150 is reset and the IRQA and IRQB pins of DSP 150 are set to indicate mode 1. Programs for DSP 150 are downloaded by microprocessor 220 through the host port, which is a set of eight directly addressable registers, addressed by 3 bits of TAbus 174. The programs are relocated by DSP 150 to its 512 word internal program space for later use in processing the digital audio data.

In mode 1, there is no external programming space required, however DSP 150 is still connected to three 32K×8 bit SRAMs 159, creating 32K×24 bits of external data storage. This external storage is used to store digital audio data. SRAMs 159 are addressed by DSPA 213 and data is transferred between DSP 150 and SRAMs 159 on DSPD 214. DSP 150 generates five control signals to control SRAM 159 operation: DSPA15, the most significant addressing bit from DSPA 213; DSPXY/ 215; DSPDS/ 216; DSPWR/ 217; and DSPRD/ 218. DSPA15 and DSPDS/ 216 (DSP data strobe) are OR'ed together in OR gate 219. The output of this OR gate is the chip enable for SRAMs 159, which are enabled whenever the DSP 150 reads from or writes to external memory, which is indicated by either DSPA15 LOW and/or DSPDS/ 216 LOW. DSPXY/ 215 is used as the most significant addressing bit in SRAMs 159. DSP 150 sees SRAMs 159 as two distinct devices: 16K×24 bits of external Y memory and 16K×24 bits of external X memory and thus DSPXY/ 215 becomes the logical signal to use to divide these 32K SRAMs into the two logical devices required by DSP 150. DSPWR/ 217 and DSPRD/ 218 are the write and read commands issued by DSP 150 to SRAMs 159.

The above addressing scheme is interrelated with the data DSP 150 receives from the CD engine through DSPD 214. Where DSPA15 is HIGH this indicates access to CD engine status register. Specifically, signals ATSB 184, SWAB 169, DEEM 181, and EFAB 181 are latched in CDE-DSP register 158 (which is shown as latches 155), and then fed through to DSP 150 on DSPD 214. CDE-DSP register 158 is controlled by DSPCDERD/ 275, which is generated by Frame Sync GAL 157 to read the CD engine status information into DSP 150. DSPCDERD/ 275 enables latches 155 when DSPRD/ 218 and DSPDS/ 216 are LOW and DSPA15 is HIGH. Actual communications between the CD engine and DSP 150 occur along UPBUS1 192 and UPBUS2 193, the asynchronous serial buses. Communications along these serial communication lines are in the format dictated by the CD engine used in the current embodiment. Reference can be made to the Philips Servomicroprocessor Application data sheet for further information.

DSP 150 is also connected to Frame Sync GAL 157, which is responsible for generating the proper timing signals for DSP 150. Frame Sync GAL 157 receives a number of signals from the CD engine. DAAB 171 is the digital audio data in I²S format. CLAB 170 is the I²S bit clock. WSAB 172 is the I²S word clock, which indicates whether the current word in a right or left channel signal. Frame Sync GAL 157 also receives signals from DSP 150 including DSPRD/ 218 (the DSP read signal); DSPDS/ 216 (the DSP data strobe); DSPA15; and DSPSTD 203 (the DSP audio transmit data). Frame Sync GAL 157 generates FSYNC 200, which frames the digital audio data for DSP 150. FSYNC 200 flags the most significant bit of the audio data stream. Then DSP 150 shifts in 24 bits from DSPSRD 202, which is the same signal as DAAB 171 after being fed through Frame Sync GAL 157. Frame Sync GAL also reclocks the audio data clock for DSP 150, which is fed in as DSPSCK 201. Finally, the processed audio data output from DSP 150 on DSPSTD 203 is passed into Frame Sync GAL 157 and then passed out as NDAAB 203, which is sent to DAIT 160.

DSP 150 is driven by 20 Mhz CLK 178, which is generated by oscillator 229 (shown in FIG. 5A). 20 Mhz CLK 178 is passed through a 2N2369 transistor switch to prevent the clock from driving DSP 150 when the main power is off (i.e. MAINSON/ 236 is HIGH).

Figure 7A:
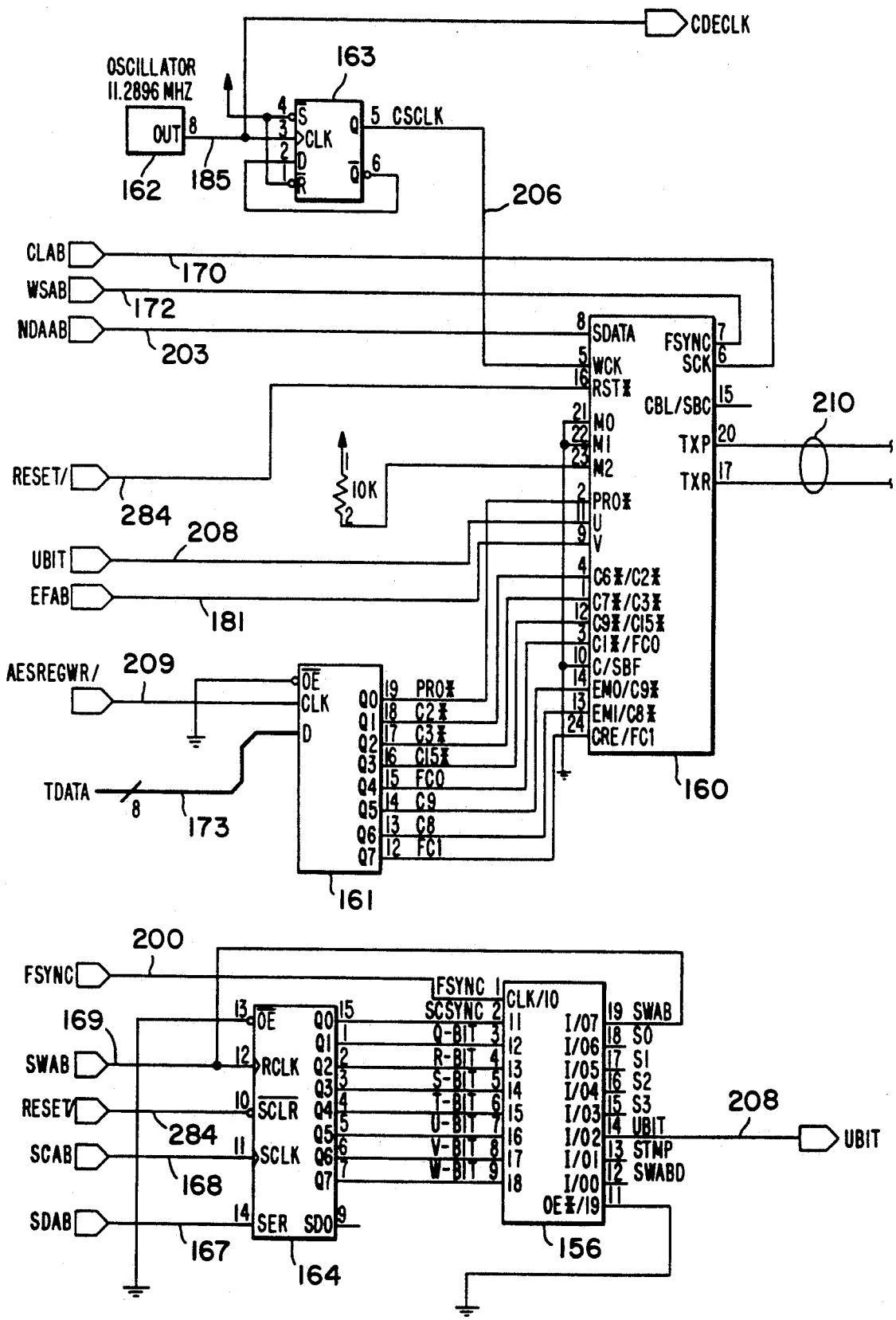
FIG. 7A of the drawings is a portion of a schematic block diagram illustrating the AES status register, serial subcode interface, 11MHZ oscillator, divide-by-two circuit, DAIT and outputs of the present invention.
Figure 7B:
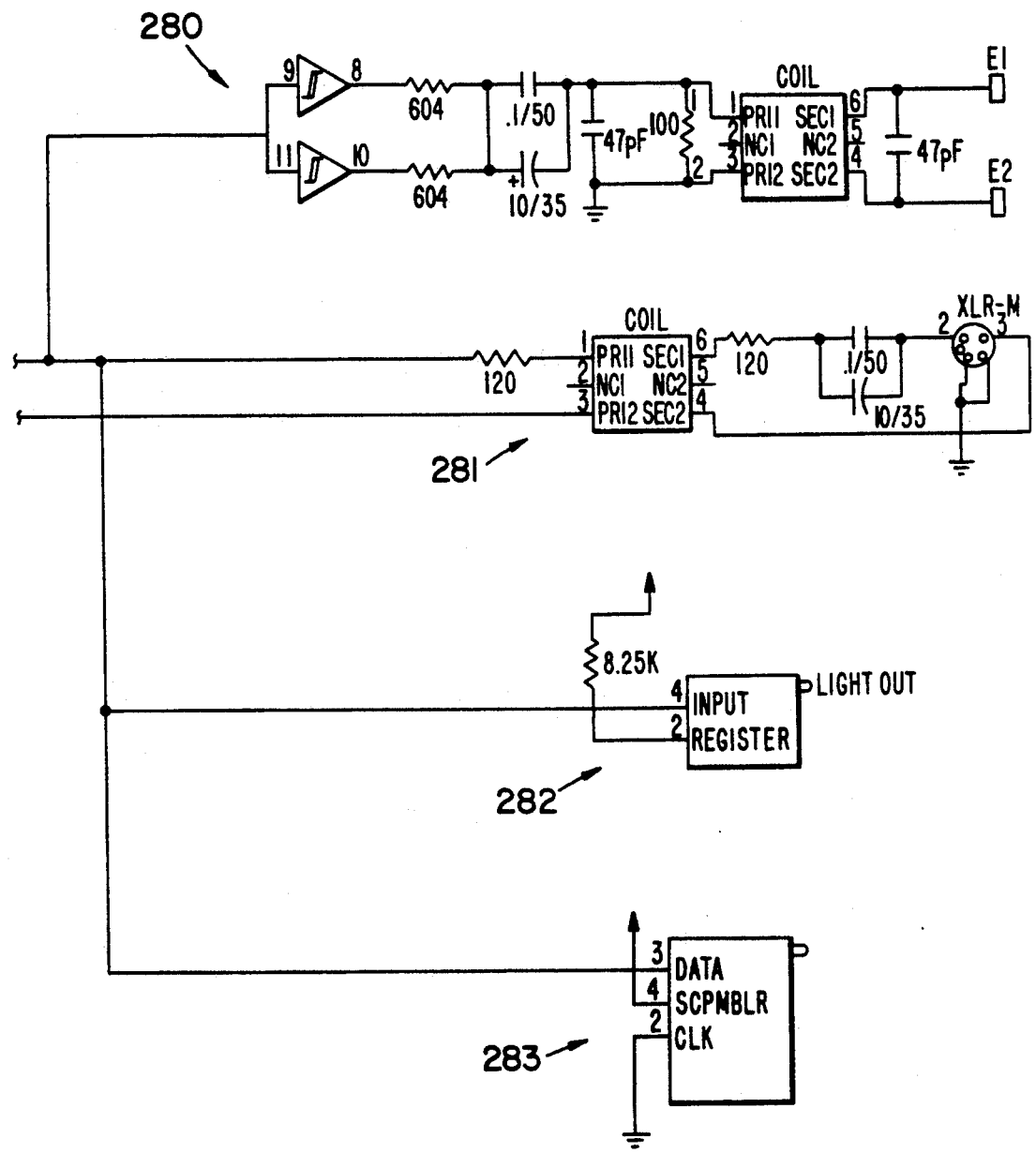
FIG. 7B of the drawings is a portion of a schematic block diagram illustrating the AES status register, serial subcode interface, 11MHZ oscillator, divide-by-two circuit, DAIT and outputs of the present invention.

FIGS. 7A and 7B of the drawings together comprise a schematic diagram of the digital audio transmitter interface (DAIT) 160. This section of apparatus 100 deals with the formatting of the data for retransmission to other digital audio components, such as a separate digital-to-analog converter. DAIT 160 is the digital audio interface transmitter that formats the digital audio I²S data in AES/EBU format for retransmission to other audio components. In the present embodiment, DAIT 160 is a Crystal Semiconductor CS8402 digital audio interface transmitter. The CS8402 was utilized because of its 24 bit wide capabilities and ability to encode I²S format, thus eliminating the need to truncate or modify the digital audio data, NDAAB 203. NDAAB 203 connects Frame Sync GAL 157 to DAIT 160, thus transporting the digital audio data.

DAIT 160 is driven by 5.6448 Mhz CLK 206, which is derived from 11.2896 Mhz CLK 185, the stable output of oscillator 162, by dividing it in half. This division is accomplished using SR flip-flop 163 as a T-type flip-flop (both inputs are tied to 11.2896 Mhz CLK 185) and using the toggling output as 5.6448 Mhz CLK 206 for DAIT 160. DAIT 160 also uses, CLAB 170 and WSAB 172, the respective clock and framing signals generated by the CD engine.

DAIT 160 also transmits subcode information using UBIT 208. SDAB 169 contains the subcode information from the CD engine in serial format, as described in the Philips servomicrocontroller Specification. Serial-to-parallel shift register 164, shifts in this data using SCAB 168, the subcode clock from the CD engine. SWAB 169, the subcode word clock indicates when the current subcode word burst has finished. The resulting parallel signals are fed into subcode GAL 156, which determines which state the CD engine is currently in, and retransmits the state information and Ubit output for DAIT 160.

AES register 161 contains status information used by DAIT 160 in reformatting the digital information. AES register 161, in the present embodiment is a 74AC574 from Texas Instruments. AES register 161 receives signals through TDATA bus 173, which is clocked into AES register 161 when AESREGWR/ 209 is LOW. The signals transferred to AES register 161 and then to DAIT 160 are a matter of standard convention, so the reader is encouraged to consult the AES/EBU Interface Specification for further detail.

DADO 210, the AES/EBU output of DAIT 160 is fed into 4 types of audio output: coaxial output 280; XLR output 281; TOSlink output 282; and AT&T type-ST output 283. These output types are well known to those with ordinary skill in the art.

Figure 8A:
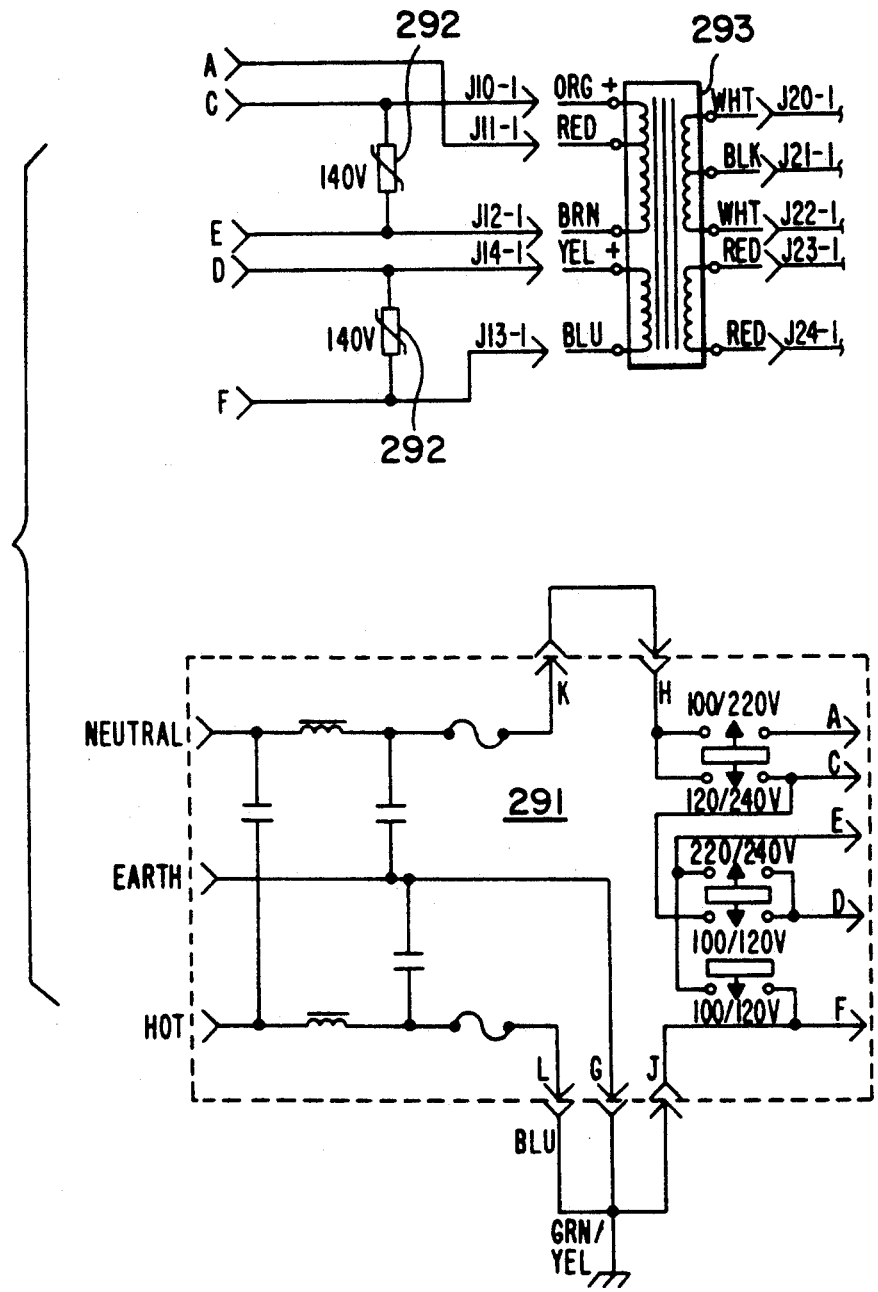
FIG. 8A of the drawings is a portion of a schematic diagram of the power supply of the present invention.
Figure 8B:
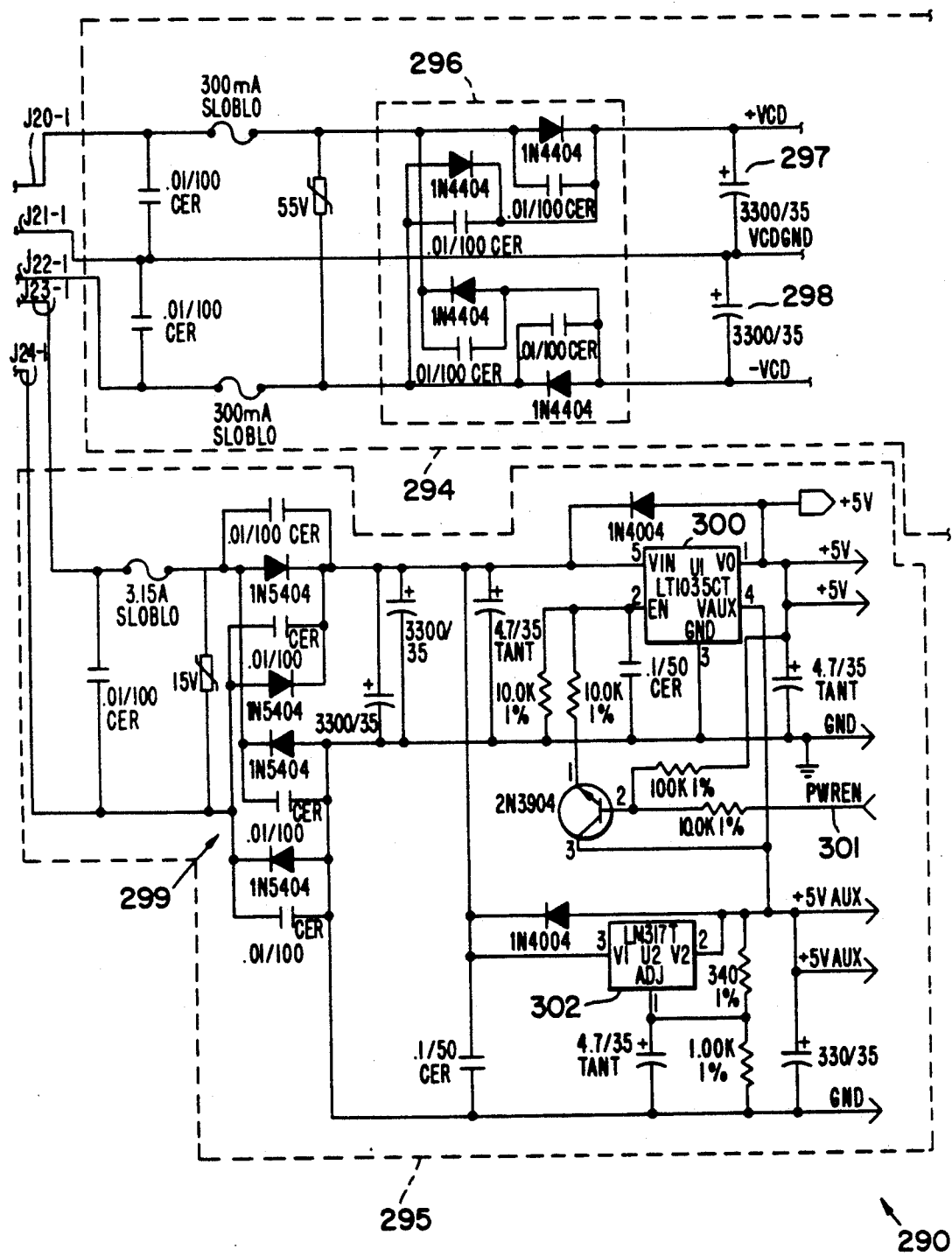
FIG. 8B of the drawings is a portion of a schematic diagram of the power supply of the present invention.
Figure 8C:
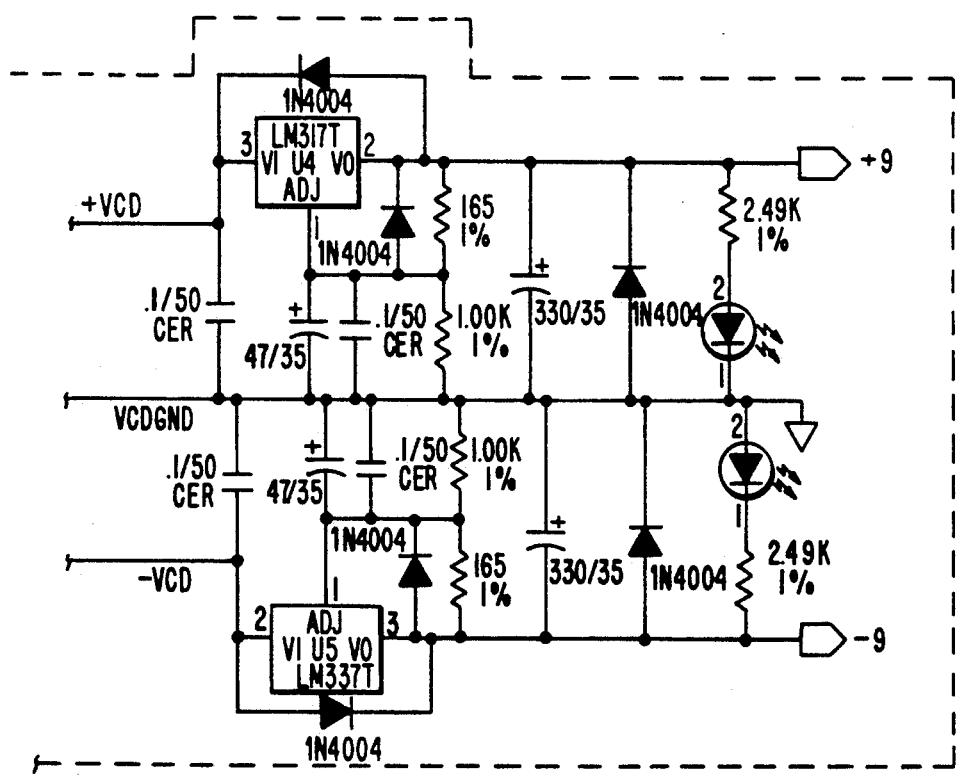
FIG. 8C of the drawings is a portion of a schematic diagram of the power supply of the present invention.

FIGS. 8A, 8B and 8C of the drawings together comprise a schematic diagram of the power supply 290 of apparatus 100. Electrical power enters apparatus 100 via power entry circuit 291, which contains a 3 conductor IEC connector, a voltage selector for selecting between 100 volts, 120 volts, 220 volts, and 240 volts, a fuse holder, and an EMI line filter. Two 140 volt metal-oxide varistors 292 provide over-voltage and line transient protection for apparatus 100. Although varistors 292 are positioned across the two 120 volt taps of transformer 293, they are effective for all four line voltages because they will appear in either parallel or series for each. Varistors 292 can conduct sufficient current to suppress a surge or blow the fuses in power entry circuit 291 to prevent damage to apparatus 100.

Transformer 293 is an "R" type power transformer, which is similar in shape to a toroid, but constructed with split bobbins, rather than a continuous wind around the core. This type of transformer was chosen to minimize radiated flux. Transformer 293 has two secondary windings: a single secondary winding of roughly 9 volts RMS for generating the 5 volt digital supplies and a center-tapped secondary of roughly 14 volts RMS for generating the 9 volt supply for the CD engine. Each secondary tap is bypassed for reduced conducted EMI, and snubbing capacitors of 0.01/100 CERs are used in connection with the rectifier diodes.

Nine volt power supply 294 is protected with a 2 amp fuse on each tap, and contains full-wave rectifier 296 to generate both positive and negative DC supplies for the CD engine. In the present embodiment, each supply is heavily filter by two 3300uF, low-ESR electrolytic capacitors 297 and 298. The filtered voltages are then regulated using an LM317T for the positive supply and an LM337T for the negative, although use of similar voltage regulators is contemplated by the inventors. Protection diodes are provided for both input short circuits and output short circuits. Nine volt power supply 294 also contains output polarity reversal protection. Finally, two LEDs are provided to visually indicate the presents of the regulated power supplies. The +/− 9 V output of nine volt power supply 294 is fed into components in the CD engine.

Five volt power supply 295 is protected by a 3.00 amp slow-blow fuse and contains full-wave rectifier 299 whose output is filtered by two 3300uF electrolytic capacitors, thus providing a 9.5 volt DC supply. This 9.5 volt supply is fed into a monolithic dual +5 volt regulator 300, which alters the signal into a 5 volt DC signal which is the main powe for the digital circuits in apparatus 100. This main power output can be shut down by the assertion of PWREN 301 which gates a 2N3904 transistor. During this standby mode, some digital components are powered by auxiliary power, which is output by voltage regulator 302 (an LM317T in the present embodiment).

Figure 9:
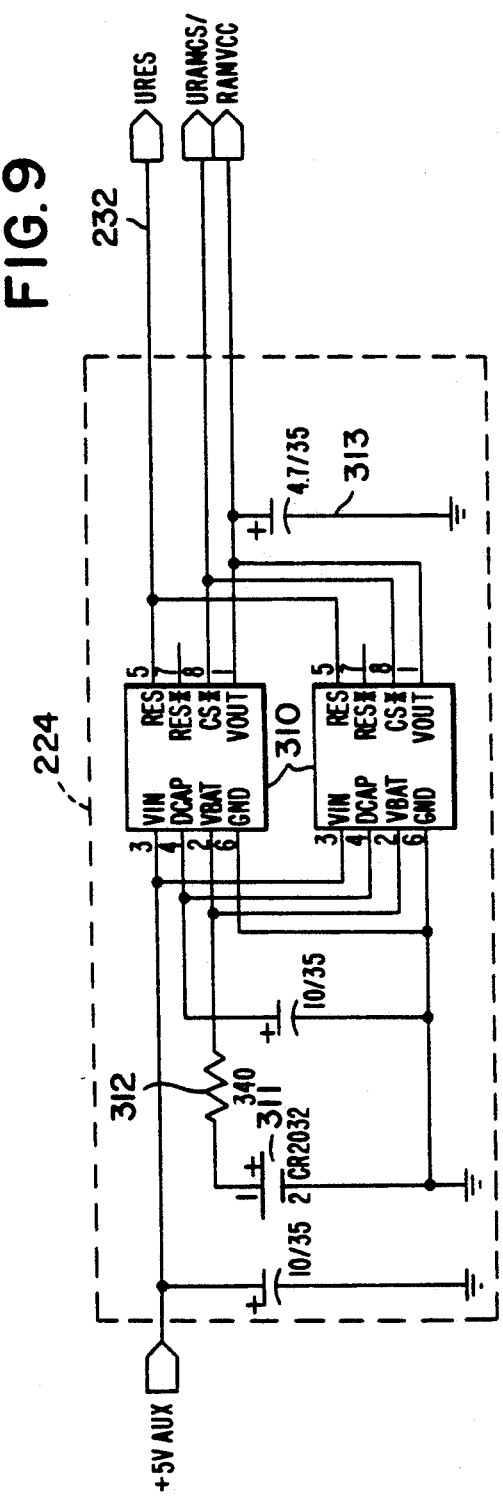
FIG. 9 of the drawings is a schematic block diagram of the battery backup circuit of the present invention.

FIG. 9 of the drawings is a schematic block diagram of battery backup 224 used by microcontroller SRAM 222 during power failure to maintain its data. In the present embodiment, battery backup 224 is comprised of Mitsubishi M62021 battery backup chips 310, 3.4 volt DC battery 311, current limiter 312 (a 340 ohm resister), and power filter 313 (a 4.7uF electrolytic capacitor). The outputs of battery backup chips 310 also drive the chip select of SRAM 222 and RST 232 on microcontroller 220.

Figure 10:
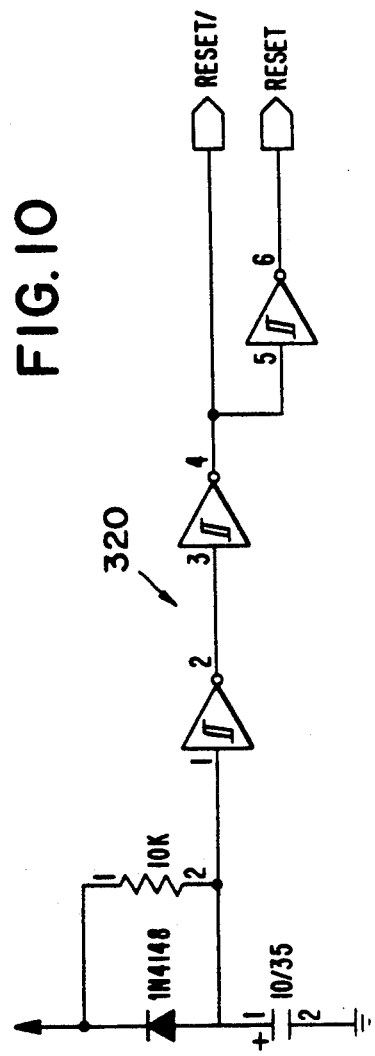
FIG. 10 of the drawings is a schematic diagram of the reset circuitry of the present invention.

FIG. 10 of the drawings is a schematic block diagram of reset circuit 320. Reset circuit 320 is comprised of a standard RC circuit buffered by two Schottky inverters to provide a clean edged reset signal to reset the CD engine, subcode interface 164 and DAIT 160. The present embodiment utilizes 74HC14 Schottky inverters from Texas Instruments, although any such similar devices may be used.

Figure 11:
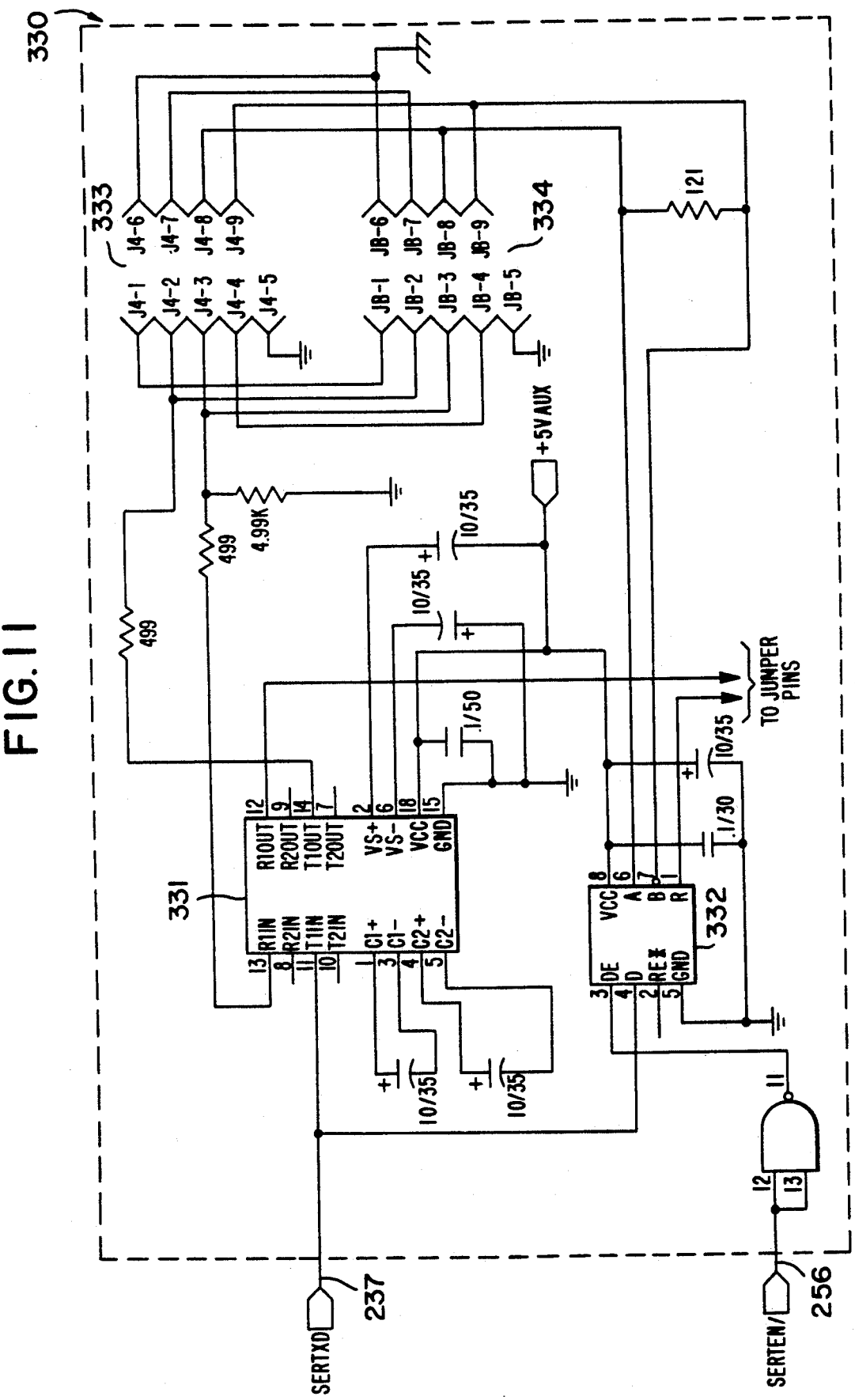
FIG. 11 of the drawings is a schematic block diagram of the automation port circuitry of the present invention.

FIG. 11 of the drawings is a schematic block diagram of automation port 330. Automation port 330 is used to operate apparatus 100 remotely via either a standard RS-232 or RS-485 interface. Transceiver 331, is a MAX-232 transceiver chip which translates the SERTXD 237 serial TTL-level data from microcontroller 220 to +/−10 volt levels. SERTEN/ 256 is provided to keep the driver side of the chip disabled, to prevent bus contention due to multiple masters during power up. SERTXD 237 can be provided at different baud rates through programming a register on microcontroller 220 to hold and send the serial data at particular times. For the present embodiment, see Signetics 80C552 Microcontroller Users Manual for more information. RS-232 output port 333 and RS-232 input port 334 are connected to external microcontrollers which may be attached to apparatus 100 to communicate with microprocessor 220.

Figure 12:
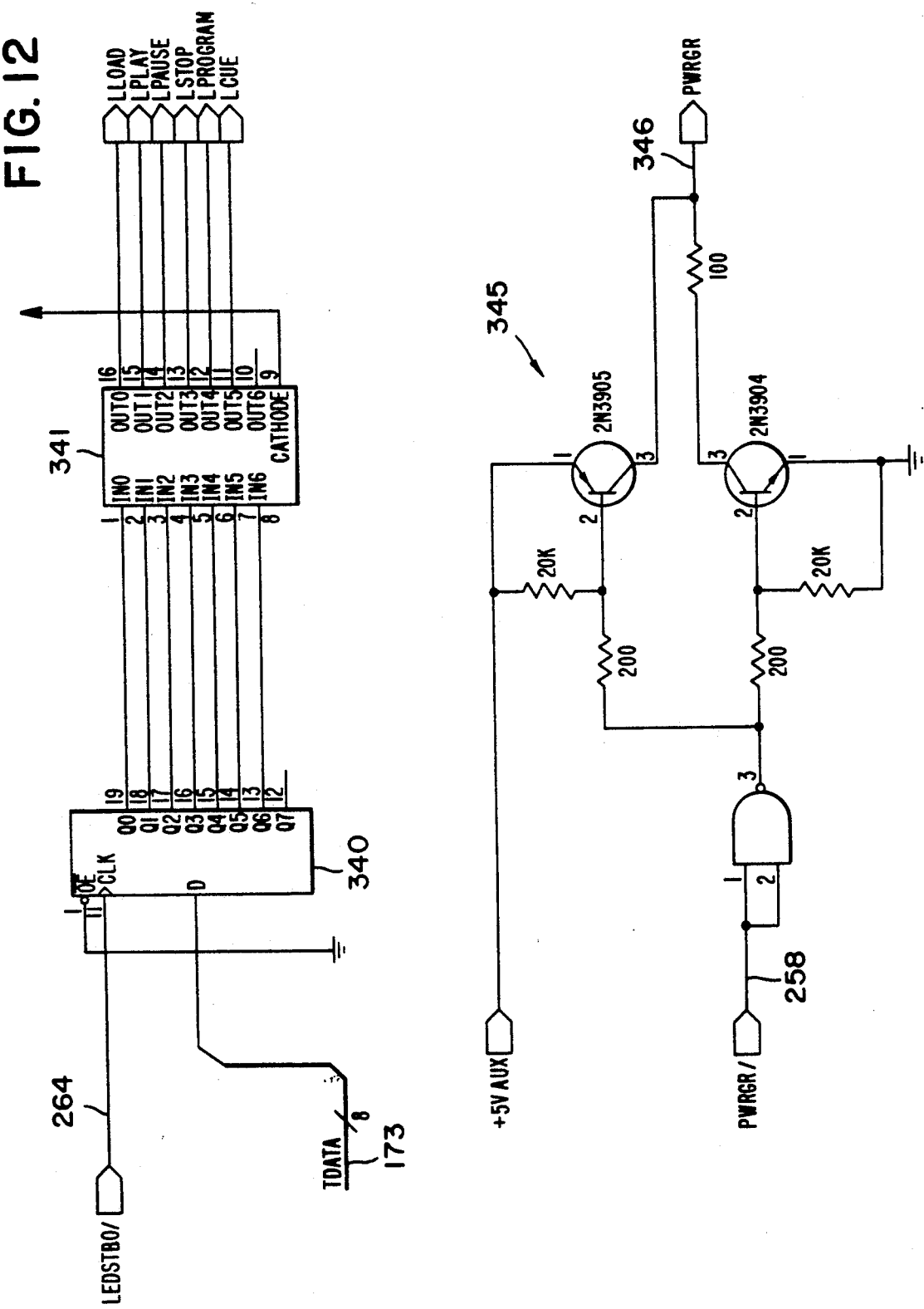
FIG. 12 of the drawings is a schematic block diagram of the LED drivers of the present invention.

FIG. 12 of the drawings is a schematic block diagram of the LED drivers contained in front panel 101 of apparatus 100. Microcontroller 220 services all of the LEDs on front panel 101 by latching the LED status in LED latch 340. Decoding GAL 226, transmits LEDSTB0/ 264 to LED latch 340, signaling it to latch the data currently found on TDATA bus 173. LED latch 340, in the present embodiment, is a Texas Instruments 74HC574 latch. This LED status information is then fed into LED driver 341, which drives most of the LEDs on front panel 101. An MC1413P LED driver is used in the present embodiment, however, any LED drivers can be used to drive the six assigned LEDs.

The remaining LEDs are associated with standby button 102. A bi-color LED is embedded in this pushbutton switch, which is driven by two driver circuit 345. One color driver circuit 345 is used for the green LED and one color driver circuit 345 for the red. Green driver circuit 345 receives PWRGR/ 258 directly from microcontroller 220. This signal is then used to gate two 2N3906 transistors, which drive PWRGR 346. The red driver circuit receives PWRRD/ 259.

Figure 13:
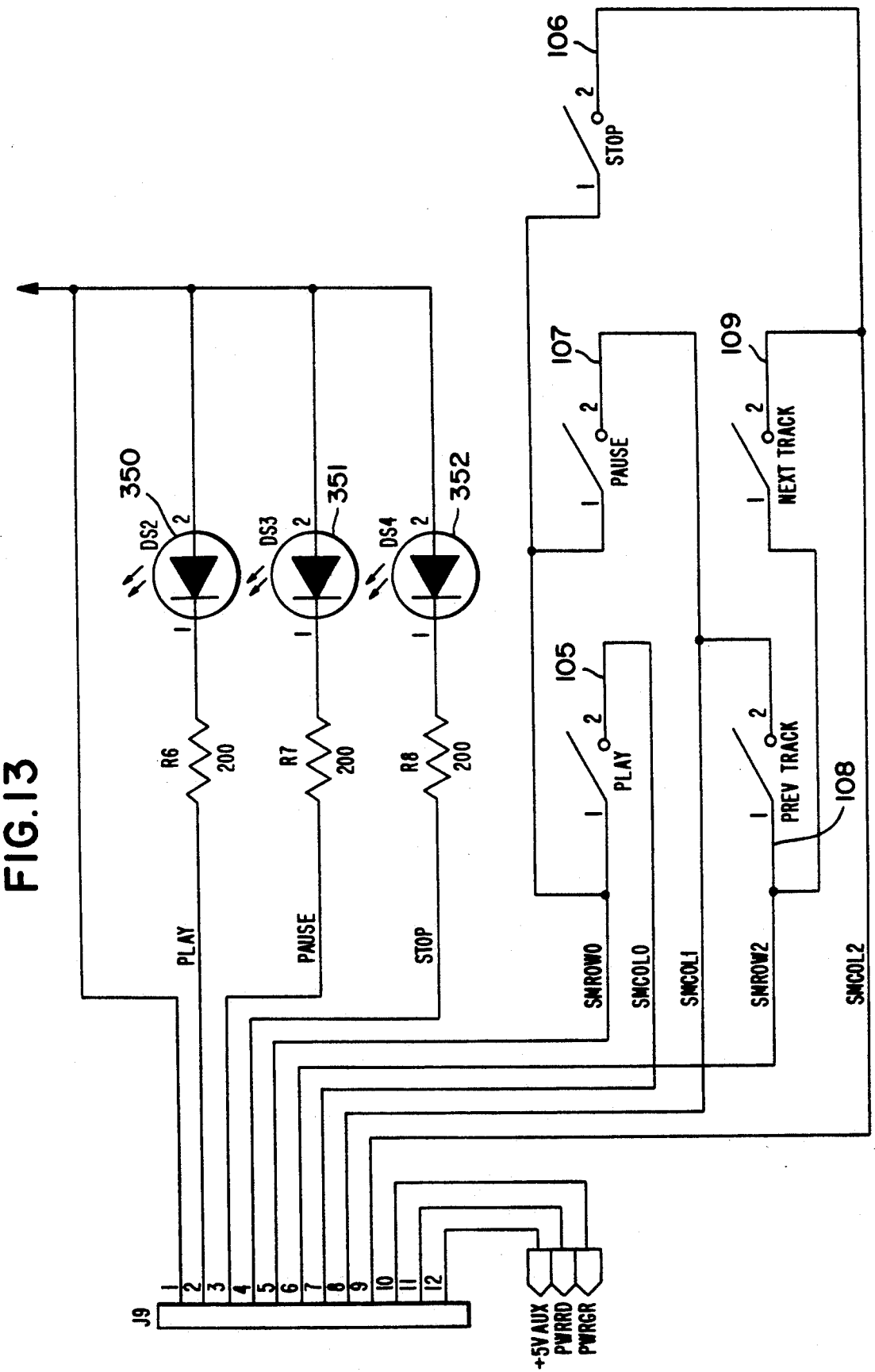
FIG. 13 of the drawings is a schematic diagram of the main key pad switches of the present invention.

FIG. 13 of the drawings is a schematic block diagram of the main key pad switches on front panel 101. LEDs 350, 351 and 352 are driven by LED driver 341 through current limiting resistors. Single throw switches 105, 106, 107, 108, and 109 are configured in a switch matrix which is scanned and decoded by microcontroller 220 to determine which interrupt has occurred. The switches are connected to microcontroller 220 through SMROW0 and SMROW2 from SMROW bus 255 and SMCOL0, SMCOL1 and SMCOL2 through SMCOL bus 250.

FIG. 14 of the drawings is a schematic block diagram of the power switch board found on front panel 101 of apparatus 100. Power button 102 is a sinqle throw switoh which activates SMROW2 and SMCOL0 in SMROW bus 255 and SMCOL bus 250, respectively, both of which are connected to microcontroller 220. Bi-color LED 360 is driven by PWRGR 346 and PWRRD 361, the outputs of green driver circuit 345 and red driver circuit 345 (shown in FIG. 12). Bi-color LED 360 glows green during normal operation, 50% red in standby mode, 100% red during power up, and flashing red on error. The modified red colors are created by microcontroller 220 pulse modulating PWRRD/ 259.

FIG. 15 of the drawings is a schematic block diagram of the program and cue switch board on front panel 101 of apparatus 100. LEDs 370 and 371 are driven by LED driver 341 (shown in FIG. 12). Single throw switches 110 and 111 (cue button and program button, respectively) are connected to microcontroller 220 through SMCOL bus 250 and SMROW bus 255 on SMROW1, SMCOL1 and SMCOL2. These signals are decoded by microcontroller 220 to determine the appropriate response.

Figure 16:
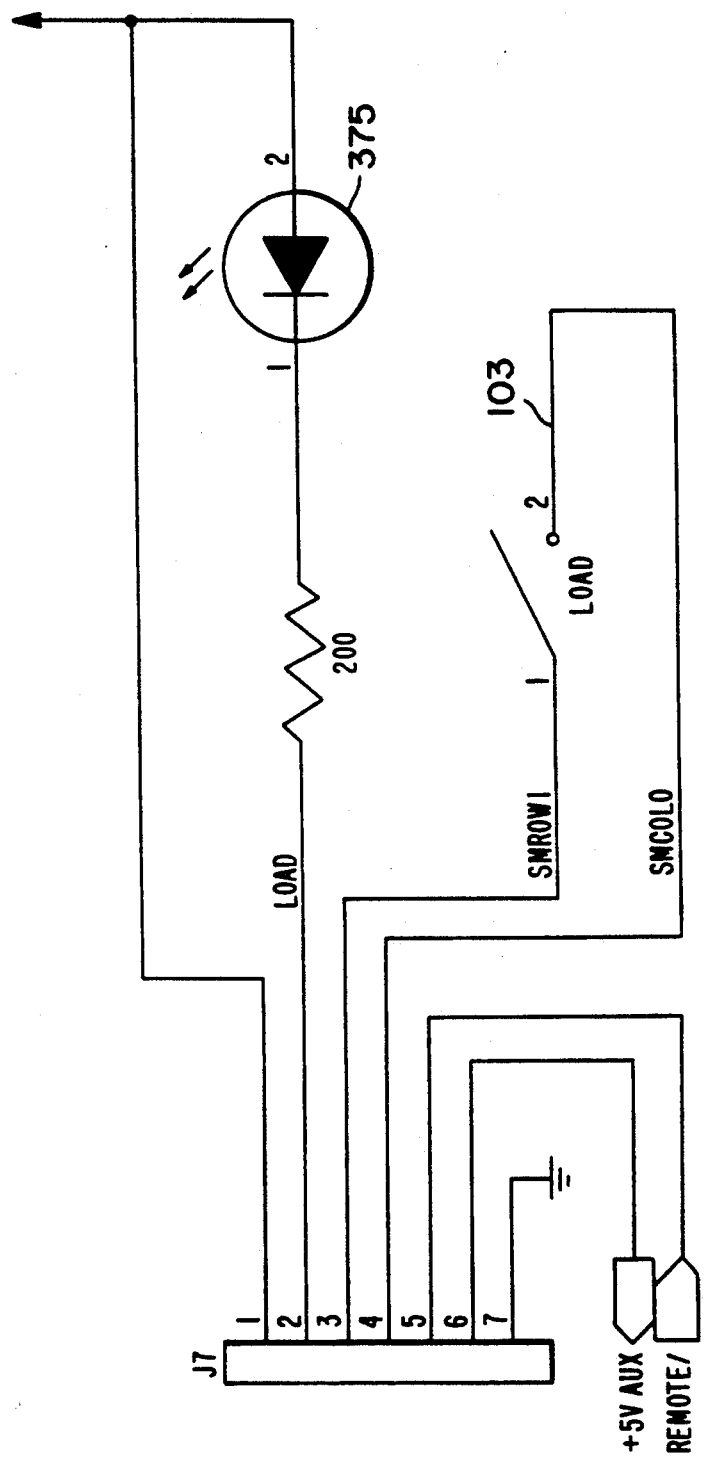
FIG. 16 of the drawings is a schematic diagram of the load switch board.

FIG. 16 of the drawings is a schematic block diagram of the load switch board on front panel 101 of apparatus 100. LED 375 is driven by LED driver 341 and load switch 103 is connected to microcontroller 220 throu9h SMCOL bus 250 and SMROW bus 255 on SMROW1 and SMCOL0. This switch indicates to microcontroller 220 that the user desires to open or close the CD platform.

Figure 17:
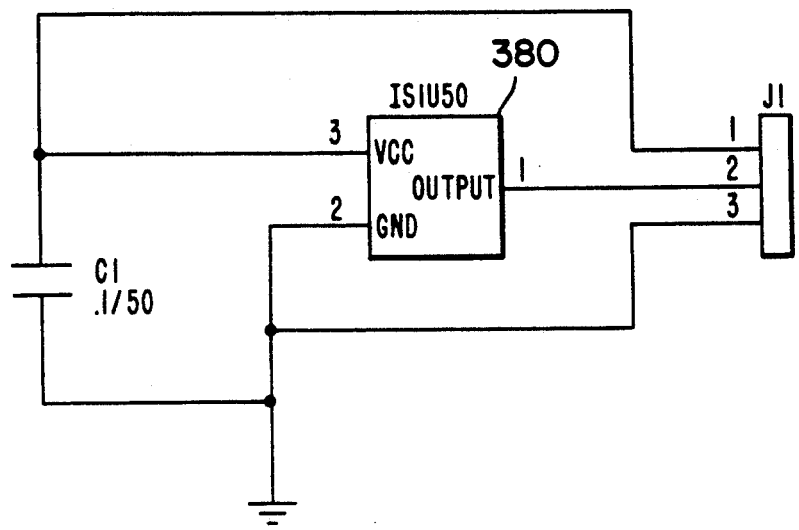
FIG. 17 of the drawings is a schematic block diagram of the IR board.

FIG. 17 of the drawings is a schematic block diagram of the IR board embedded in front panel 101 of apparatus 100. Remote control receiver 380 is an integrated infrared detector/preamplifier, which provides a pulse position modulated wavefo in response to signals from remote control 120, via REMOTE/ 257, to microcontroller 220 for decoding.

Figure 18:
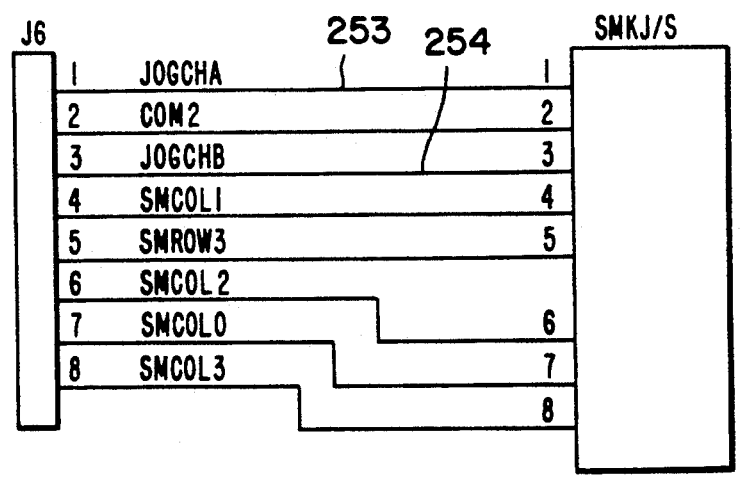
FIG. 18 of the drawings is a schematic block diagram of the job/shuttle board.

FIG. 18 of the drawings is a schematic block diagram of the jog/shuttle board on front panel 101 of apparatus 100. On front panel 101, jog dial 112 is mounted concentrically with shuttle control 113. Jog dial 112 is mechanically attached to a quadrature phase, 10 counts per revolution encoder, whose two outputs, JOGCHA 253 and JOGCHB 254 are provided directly to a data register located in microcontroller 220 where they are decoded and the appropriate jogging of the compact disc and CD pickup are ordered. Shuttle knob 113 is a nine position mechanical wiper switch, which is connected to microcontroller 220 through SMCOL bus 250 and SMROW bus 255 on SMCOL0, SMCOL1, SMCOL2, SMCOL3, and SMROW3. The unique signal sent along these lines indicates to microcontroller 220, the search direction and speed desired by the user.

What is claimed is:

1. A compact disc transport apparatus, said apparatus being capable of receiving a standard compact disc, reading the digitally encoded information from said compact disc, processing said digitally encoded information, toward transmitting audio signals in a digital format together with digital audio control signals, said compact disc apparatus comprising:

CD platform means for accepting, rotating and positioning said compact disc so as to facilitate reading by an optical CD pickup;

CD engine means for controlling said CD platform means and said optical CD pickup and formatting said digitally encoded information as it is read from said compact disc when said optical CD pickup is in an engaged position and providing a digital audio signal output and an audio control signal output;

control means for controlling said CD platform means and said CD engine means, said control means including control switch means for commanding said CD engine to move said optical CD pickup to a desired position on the compact disc;

digital audio signal processing means operably connected to said CD engine means and said control means for processing said digital audio signal from said CD engine means;

said digital audio signal processing means further serving to ramp down the gain of said digital audio signal to substantially minimize clicking and popping when said optical CD pickup is in said engaged position and said control means has been commanded to move said optical CD pickup within the current track in response to instructions issued by the user through said control means;

said digital audio signal processing means further serving to ramp up the gain of said digital audio signal to its original level when said optical CD pickup is in said engaged position and said control means is no longer being commanded by the user to move said optical CD pickup within the current track;

digital transmission means connected to said digital audio signal processing means for transmitting said digital audio signal together with said audio control signal to an external digital audio processing device.

2. The invention according to claim 1 wherein said control switch means includes:

cueing switch means for incrementally positioning said CD pickup in response to the direction, distance and speed of movement of said cueing switch means and wherein said CD pickup is moved only during movement of said cueing switch means.

3. The invention according to claim 1 wherein said control switch means includes:

shuttle switch means for positioning said CD pickup in response to the direction and distance of movement of said shuttle switch means, said shuttle switch means having active and inactive positions and wherein said CD pickup is moved for so long as said shuttle switch means is in an active position.

4. A compact disc transport apparatus, said apparatus being capable of receiving a standard compact disc, reading the digitally encoded information from said compact disc, processing said digitally encoded information, toward transmitting audio signals in a digital format together with digital audio control signals, said compact disc apparatus comprising:

CD platform means for accepting, rotating and positioning said compact disc so as to facilitate reading by an optical CD pickup;

CD engine means for controlling said CD platform means and said optical CD pickup and formatting said digitally encoded information as it is read from said compact disc and providing a digital audio signal output and an audio control signal output;

control means for controlling said CD platform means and said CD engine means, said control means including control switch means for commanding said CD engine to move said optical CD pickup to a desired position on the compact disc;

cueing switch means for incrementally positioning said CD pickup in response to the direction, distance and speed of movement of said cueing means and wherein said CD pickup is moved only during movement of said cueing switch means;

digital audio signal processing means operably connected to said CD engine means and said control means for processing said digital audio signal from said CD engine means;

digital transmission means connected to said digital audio signal processing means for transmitting said digital audio signal together with said audio control signal to an external digital audio processing device.

5. The invention according to claim 4 wherein said digital audio signal processing means further serves to change the gain of said digital audio signal when said control means has been commanded to move said CD pickup in response to instructions issued by the user through said control means.

6. A compact disc transport apparatus, said apparatus being capable of receiving a standard compact disc, reading the digitally encoded information from said compact disc, processing said digitally encoded information, toward transmitting audio signals in a digital format together with digital audio control signals, said compact disc apparatus comprising:

CD platform means for accepting, rotating and positioning said compact disc so as to facilitate reading by an optical CD pickup;

CD engine means for controlling said CD platform means and said optical CD pickup and formatting said digitally encoded information as it is read from said compact disc and providing a digital audio signal output and a audio control signal output;

control means for controlling said CD platform means and said CD engine means, said control means including control switch means for commanding said CD engine to move said optical CD pickup to a desired position on the compact disc;

shuttle switch means for positioning said CD pickup in response to the direction and distance of movement of said shuttle switch means, said shuttle switch means having active and inactive positions and wherein said CD pickup is moved for so long as said shuttle switch means is in an active position;

digital audio signal processing means operably connected to said CD engine means and said control means for processing said digital audio signal from said CD engine means;

digital transmission means connected to said digital audio signal processing means for transmitting said digital audio signal together with said audio control signal to an external digital audio processing device.

7. The invention according to claim 6 wherein said digital audio signal processing means further serves to change the gain of said digital audio signal when said control means has been commanded to move said CD pickup in response to instructions issued by the user through said control means.

8. A compact disc transport apparatus, said apparatus being capable of receiving a standard compact disc, reading the digitally encoded information from said compact disc, processing said digitally encoded information, toward transmitting audio signals in a digital format together with digital audio control signals, said compact disc apparatus comprising:

CD platform means for accepting, rotating and positioning said compact disc so as to facilitate reading by an optical CD pickup;

CD engine means for controlling said CD platform means and said optical CD pickup and formatting said digitally encoded information as it is read from said compact disc and providing a digital audio signal output and an audio control signal output;

control means for controlling said CD platform means and said CD engine means, said control means including control switch means for commanding said CD engine to move said optical CD pickup to a desired position on the compact disc;

said control switch means including cueing switch means for incrementally positioning said CD pickup in response to the direction, distance and speed of movement of said cueing switch means and wherein said CD pickup is moved only during movement of said cueing switch means;

digital audio signal processing means operably connected to said CD engine means and said control means for processing said digital audio signal from said CD engine means;

said digital audio signal processing means further serving to change the gain of said digital audio signal when said control means has been commanded to move said CD pickup in response to instructions issued by the user through said control means;

digital transmission means connected to said digital audio signal processing means for transmitting said digital audio signal together with said audio control signal to an external digital audio processing device.

9. A compact disc transport apparatus, said apparatus being capable of receiving a standard compact disc, reading the digitally encoded information from said compact disc, processing said digitally encoded information, toward transmitting audio signals in a digital format together with digital audio control signals, said compact disc apparatus comprising:

CD platform means for accepting, rotating and positioning said compact disc so as to facilitate reading by an optical CD pickup;

CD engine means for controlling said CD platform means and said optical CD pickup and formatting said digitally encoded information as it is read from said compact disc and providing a digital audio signal output and an audio control signal output;

control means for controlling said CD platform means and said Cd engine means, said control means including control switch means for commanding said CD engine to move said optical CD pickup to a desired position on the compact disc;

said control switch means including shuttle switch means for positioning said CD pickup in response to the direction and distance of movement of said shuttle switch means, said shuttle switch means having active and inactive positions and wherein said CD pickup is moved for so long as said shuttle switch means is in an active position;

digital audio signal processing means operably connected to said CD engine means and said control means for processing said digital audio signal from said CD engine means;

said digital audio signal processing means further serving to change the gan of said digital audio signal when said control means has been commanded to move said CD pickup in response to instructions issued by the user through said control means;

digital transmission means connected to said digital audio signal processing means for transmitting said digital audio signal together with said audio control signal to an external digital audio processing device.

* * * * *

UNITED STATES PATENT AND TRADEMARK OFFICE
CERTIFICATE OF CORRECTION

PATENT NO. : 5,289,439
DATED : February 22, 1994
INVENTOR(S) : Koulopoulos et al.

It is certified that error appears in the above-indentified patent and that said Letters Patent is hereby corrected as shown below:

| | |
|---|---|
| Col. 4, line 35 | Delete "job" and insert instead -- jog --. |
| Col. 7, line 5 | Delete "cause" and insert instead -- causes --. |
| Col. 8, line 37-38 | Delete "20 Mhz$_{13}$CLK" and insert instead -- 20 Mhz__CLK --. |
| Col. 11, line 58 | Delete "EPRO" and insert instead -- EPROM --. |
| Col. 16, line 23 | Delete "powe" and insert instead -- power --. |
| Col. 17, line 34 | Delete "sinqle" and insert instead -- single --. |
| Col. 17, lines 34-35 | Delete "switoh" and insert instead -- switch --. |
| Col. 17, line 59 | Delete "throu9h" and insert instead -- through --. |
| Col. 17, line 69 | Delete "wavefo" and insert instead -- waveform --. |
| Col. 21, line 17 | Delete "Cd" and insert instead -- CD --. |
| Col. 22, line 12 | Delete "gan" and insert instead -- gain --. |

Signed and Sealed this

Twenty-fifth Day of April, 1995

Attest:

BRUCE LEHMAN

Attesting Officer     Commissioner of Patents and Trademarks